US012797832B2

(12) United States Patent
Kang et al.

(10) Patent No.: US 12,797,832 B2
(45) Date of Patent: Nov. 17, 2026

(54) TRIPHASIC METAL OXIDE PHOTOCTALYST FOR HYDROGEN PEROXIDE PRODUCTION FROM OXYGEN REDUCTION AND WATER OXIDATION

(71) Applicant: KOREA ADVANCED INSTITUTE OF SCIENCE AND TECHNOLOGY, Yuseong-gu (KR)

(72) Inventors: Jeung Ku Kang, Yuseong-gu (KR); Keon-Han Kim, Yuseong-gu (KR); Jong Hui Choi, Yuseong-gu (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 754 days.

(21) Appl. No.: 18/302,044

(22) Filed: Apr. 18, 2023

(65) Prior Publication Data

US 2023/0330639 A1 Oct. 19, 2023

(30) Foreign Application Priority Data

Apr. 18, 2022 (KR) ........................ 10-2022-0047810
Apr. 13, 2023 (KR) ........................ 10-2023-0048774

(51) Int. Cl.

| | |
|---|---|
| ***B01J 23/745*** | (2006.01) |
| ***B01J 21/06*** | (2006.01) |
| ***B01J 23/75*** | (2006.01) |
| ***B01J 35/30*** | (2024.01) |
| ***B01J 35/39*** | (2024.01) |
| ***B01J 35/45*** | (2024.01) |
| ***B01J 37/08*** | (2006.01) |
| ***C01B 15/027*** | (2006.01) |

(52) U.S. Cl.

CPC ........... *B01J 23/745* (2013.01); *B01J 21/063* (2013.01); *B01J 23/75* (2013.01); *B01J 35/39* (2024.01); *B01J 35/393* (2024.01); *B01J 35/45* (2024.01); *B01J 37/08* (2013.01); *C01B 15/027* (2013.01); *B01J 2235/00* (2024.01); *B01J 2235/30* (2024.01)

(58) Field of Classification Search

CPC ..... C01B 21/086; C01B 21/0935; B01D 1/22; B01D 11/0492; H01M 10/0525; H01M 10/0568; H01M 2300/0025; C01P 2006/40; Y02P 20/133; Y02E 60/10

See application file for complete search history.

(56) References Cited

PUBLICATIONS

Kim et al. (Triphasic Metal Oxide Photocatalyst for Reaction Site-Specific Production of Hydrogen Peroxide from OxygenReduction and Water Oxidation, Advanced Energy Materials, 2022) (Year: 2022).*

Liang et al. (Preparation and characterization of TiO2-Graphene@Fe3O4 magnetic composite and its application in the removal of trace amounts of microcystin-LR, RCS Advances, 2014) (Year: 2014).*

(Continued)

*Primary Examiner* — Anthony J Zimmer
*Assistant Examiner* — Logan Laclair
(74) *Attorney, Agent, or Firm* — Shih IP Law Group, PLLC.

(57) ABSTRACT

The present disclosure relates to a triphasic metal oxide composite including a nanosheet and a core-shell structure, a photocatalyst including the same, and a method of preparing the same.

19 Claims, 27 Drawing Sheets

(56) References Cited

PUBLICATIONS

Shi et al. (Synergistic catalysis of Co3O4 and graphene oxide on Co3O4/GO catalysts for degradation of Orange II in water by advanced oxidation technology based on sulfate radicals, Chemical Engineering Journal, 2014) (Year: 2014).*

Keon-Han Kim et al., Triphasic Metal Oxide Photocatalyst for Reaction Site-Specific Production of Hydrogen Peroxide from Oxygen Reduction and Water Oxidation, Advanced Energy Materials, 2022, 12, 2104052 (Feb. 25, 2022).

Hyunwoong Park et al., Surface modification of TiO2 photocatalyst for environmental applications, Journal of Photochemistry and Photobiology C: Photochemistry Reviews 2013, vol. 15, pp. 1-20.

* cited by examiner

FIG. 4A(ii)

FIG. 4A(iii)

*FIG. 4B(ii)*
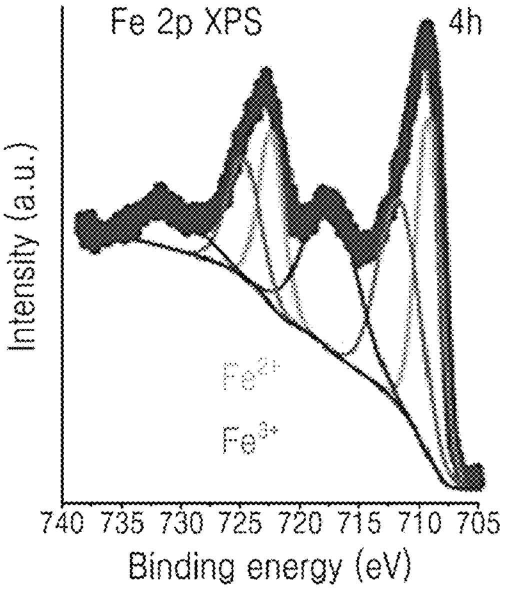
*FIG. 4B(iii)*
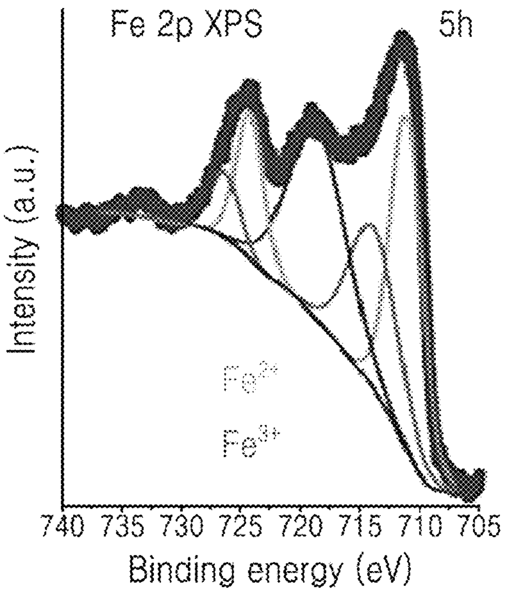
*FIG. 5A*
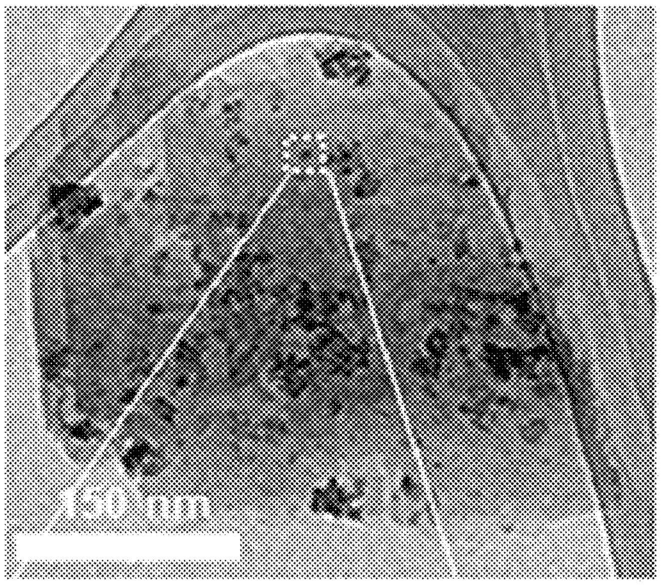

TRIPHASIC METAL OXIDE PHOTOCTALYST FOR HYDROGEN PEROXIDE PRODUCTION FROM OXYGEN REDUCTION AND WATER OXIDATION

CROSS-REFERENCE TO RELATED APPLICATION

This application claims the benefit under 35 U.S.C. 119(a) of Korean Patent Applications No. 10-2022-0047810 filed on Apr. 18, 2022, and No. 10-2023-0048774 filed on Apr. 13, 2023 in the Korean Intellectual Property Office, the entire disclosures of which are incorporated herein by reference for all purposes.

TECHNICAL FIELD

The present disclosure relates to a triphasic metal oxide composite including a nanosheet and a core-shell structure, a photocatalyst including the same, and a method of preparing the same.

BACKGROUND

The artificial photosynthesis is an attractive method to convert various chemical resources into value-added fuels using water, and its photosynthetic regeneration of hydrogen peroxide ($H_2O_2$) represents an important class of appealing methods. $H_2O_2$ is used in many fields including chemical industry, environmental remediation, medical treatment, and energy storage. The anthraquinone method is used for industrial $H_2O_2$ production, but a significant energy is required due to the multistep sequences related to hydrogenation and oxidation of anthraquinone molecule, extraction, purification, and concentration. Also, its hydrogenation process under a high pressure leads to safety concerns. Besides, noble metal-based catalysts could be too expensive for practical applications so that designing a photocatalyst using earth-abundant elements is a great option for energy-efficient and cheap $H_2O_2$ production. Oxygen in a molecular form ($O_2$) could be converted into $H_2O_2$ by combining with two protons and electrons produced via water oxidation upon light absorption. However, the single-phase or dual-phase photocatalysts have the structural limitations to overcome poor activity and low selectivity, and short cycle stability. For instance, graphitic carbon nitride (g-$C_3N_4$), which is commonly used as a single-phase photocatalyst, induces fast electron-hole separation from π-π conjugated orbitals in the basal planes, but its low valence band position hinders water oxidation to occur at the same time. Similarly, while a single-phase titanium dioxide ($TiO_2$) photocatalyst has a high valence band position allowing water oxidation, its photogenerated holes lead to the decomposition of $H_2O_2$.

PRIOR ART DOCUMENT

Non-Patent Literature

H. Park, Y. Park, W. Kim and W. Choi, *J. Photochem. Photobio. C,* 2013, 15, 1-20.

SUMMARY

The present disclosure provides a triphasic metal oxide composite including a nanosheet and a core-shell structure, a photocatalyst including the same, and a method of preparing the same.

However, problems to be solved by the present disclosure are not limited to the above-described problems. Although not described herein, other problems to be solved by the present disclosure can be clearly understood by those skilled in the art from the following descriptions.

A first aspect of the present disclosure provides a composite including a nanosheet including a cobalt oxide; and a core-shell particle including a core including an iron oxide and a shell including a titanium oxide, and the core-shell particle is located on the nanosheet.

A second aspect of the present disclosure provides a photocatalyst that includes the composite according to the first aspect.

A third aspect of the present disclosure provides a method of preparing a composite including performing hydrothermal reaction of a cobalt ion-containing precursor, an iron ion-containing precursor, and a titanium ion-containing precursor to form a composite, and the composite includes a nanosheet including a cobalt oxide; and a core-shell particle including a core including an iron oxide and a shell including a titanium oxide.

A composite according to embodiments of the present disclosure includes a reaction site-specific triphasic metal oxide. When the composite is used as a photocatalyst for direct conversion of oxygen into hydrogen peroxide, it exhibits a high activity of about 1.6 mmol $H_2O_2$/g·h or more and has a selectivity of about 100%. Also, when the composite is used repeatedly, it has excellent stability.

The composite according to the embodiments of the present disclosure includes a nanosheet including a cobalt oxide, and a core-shell particle including an iron oxide and a titanium oxide. The nanosheet serves as a water oxidation site, and the core-shell particle serves as an oxygen reduction site. That is, the reaction sites are specified. Therefore, when the composite is used as a photocatalyst for production of hydrogen peroxide, it exhibits about 10 times higher activity than conventional photocatalysts including single-phase and dual-phase metals.

The composite according to the embodiments of the present disclosure includes the core-shell particle including a core including an iron oxide and a shell including a titanium oxide. The shell may be an ultrathin shell having a thickness of about 10 nm or less.

A method of preparing a composite according to embodiments of the present disclosure includes one-pot hydrothermal reaction, and is performed through a simple process procedure.

The method of preparing a composite according to the embodiments of the present disclosure may induce phase separation between a nanosheet and a core-shell particle by controlling an oxidation number of a metal ion precursor in a solution during the hydrothermal reaction.

The method of preparing a composite according to the embodiments of the present disclosure may automatically form the core-shell particle including a core including an iron oxide and a shell including a titanium oxide due to a difference in surface energy between the iron oxide and the titanium oxide.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

(FIG. 1A) Illustration of the triphasic metal oxide photocatalyst with Co, Fe, and Ti oxide phases (denoted as "CFT") for water oxidation, exciton (electron-hole pair) separation, and oxygen reduction; (FIG. 1B) Schematic core-shell structure formation mechanism via core-shell stabilization; (FIG. 1C) HR-TEM image of the triphasic metal oxide photocatalyst (CFT-5h) synthesized through phase separation and core-shell stabilization processes; (FIG. 1D) DFT-calculated band alignment in the CFT photocatalyst with cobalt hydroxide carbonate ($Co_2(OH)_2CO_3$), iron oxide ($Fe_3O_4$), and titanium oxide ($TiO_2$) phases (The VBM and CBM of anatase-$TiO_2$ and rutile-$TiO_2$ are discerned with (a) and (r) marks, respectively, where the $O_2/H_2O_2$ redox potential is 0.70 V vs. NHE, and the $H_2O/O_2$ redox potential is 1.23 V vs. NHE. Also, the possible charge transfer pathways are described with dashed arrows in which deep gray indicates a photogenerated electron, and light gray indicates a photogenerated hole).

(FIG. 2A) High angle annular dark field (HAADF)-scanning transmission microscopy (STEM) image of a single nanoparticle separated from a cobalt carbonate hydroxide nanosheet in CFT-3h; (FIG. 2B) STEM-electron energy loss spectroscopy (EELS) line profile of CFT-3h; (FIG. 2C) Ti/Fe and (FIG. 2D) Co element STEM-energy dispersive spectroscopy (EDS) mapping images of CFT-3h (scale bar: 5 nm), where the EELS line profile of FIG. 2B is analyzed from FIG. 2A.

FIG. 5A to FIG. 5E show characterization of CFT-5h according to an example of the present disclosure: (FIG. 5A) TEM image of whole system in CFT-5h; (FIG. 5B) STEM-EELS line profile of CFT-5h; (FIG. 5C) HAADF-STEM image of CFT-5h; (FIG. 5D) Ti/Fe and (FIG. 5E) Co element STEM-EDS mapping images of CFT-5h (scale bar: 7 nm), where the EELS line profile of FIG. 5B is analyzed from STEM image of a single nanoparticle grown on a cobalt carbonate hydroxide nanosheet in CFT-5h of FIG. 5A.

(FIG. 9A) Fe K-edge XANES and (FIG. 9B) Ti K-edge XANES for CFT; (FIG. 9C) Ti K-edge XANES, (FIG. 9D) Ti K-edge EXAFS, (FIG. 9E) Raman spectra, (FIG. 9F) photoluminescence spectra, and (FIG. 9G) time-correlated single photon counting (TCSPC) spectra for dual-phase CT and triphasic CFT photocatalysts.

(FIG. 10A) The proposed reaction mechanism; (FIG. 10B) in situ Co K-edge XANES; (FIG. 10C) in situ Fe K-edge XANES; (FIG. 10D) Mass spectrum of evolved $O_2$ from $H_2{}^{18}O$ isotope; and (FIG. 10E) $O_2$ adsorption isotherms for CFT, CT and FT.

(FIG. 14A) Photocatalytic production and decomposition (Co=1 mM) of $H_2O_2$ under $O_2$ equilibrium conditions for CFT; (FIG. 14B) Photocatalytic production of $H_2O_2$ with different gas conditions for CFT; (FIG. 14C) Photocatalytic production of $H_2O_2$ under different light conditions for CFT with AQY; (FIG. 14D) Photocurrent density under an $O_2$-saturated 1 M $K_2SO_4$ solution on −0.4 V (vs. Ag/AgCl) for CFT; (FIG. 14E) $H_2O_2$ production recyclability test for CFT; (FIG. 14F) $H_2O_2$ production rates for recent reported photocatalysts and CFT.

DETAILED DESCRIPTION

Figure 1A:
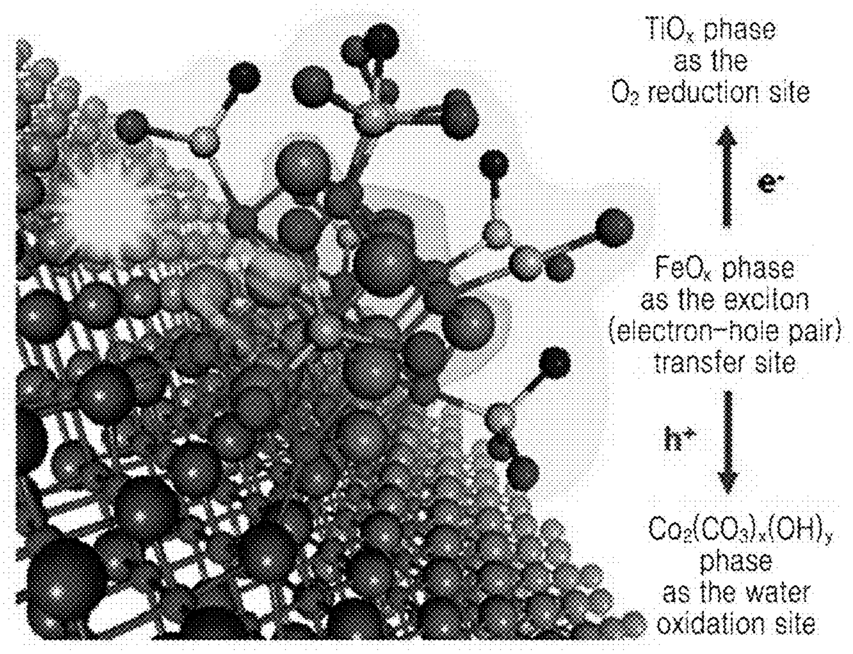
FIG. 1A to FIG. 1D show design of the reaction site-specific triphasic metal oxide photocatalyst enabling the highly active, selective, and stable conversion of molecular oxygen ($O_2$) into hydrogen peroxide ($H_2O_2$) according to an example of the present disclosure.

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples, and drawings.

A first aspect of the present disclosure provides a composite including a nanosheet including a cobalt oxide; and a core-shell particle including a core including an iron oxide and a shell including a titanium oxide, and the core-shell particle is located on the nanosheet.

In an embodiment of the present disclosure, the cobalt oxide may include at least one selected from cobalt hydroxide carbonate ($Co_2(OH)_2CO_3$), $Co_2O_3$, and CoO, but may not be limited thereto.

In an embodiment of the present disclosure, the iron oxide may include at least one selected from $Fe_3O_4$, FeO, and $Fe_3O_3$, but may not be limited thereto.

In an embodiment of the present disclosure, the titanium oxide may include $TiO_2$, but may not be limited thereto.

In an embodiment of the present disclosure, the titanium oxide may be crystalline and/or amorphous. In an embodiment of the present disclosure, if the titanium oxide is amorphous, the number of defect sites is greater than a case where the titanium oxide is crystalline. Thus, the amorphous titanium oxide may be preferable for providing an oxygen reduction site.

In an embodiment of the present disclosure, the titanium oxide may have at least one crystal structures selected from a rutile structure and an anatase structure, but may not be limited thereto.

In an embodiment of the present disclosure, a diameter of the core-shell particle may be about 10 nm to about 50 nm, but may not be limited thereto.

In an embodiment of the present disclosure, a thickness of the shell may be about 1 nm to about 10 nm, but may not be limited thereto. In an embodiment of the present disclosure, the thickness of the shell may be about 1 nm to about 10 nm, about 1 nm to about 7 nm, or about 1 nm to about 5 nm but may not be limited thereto. In an embodiment of the present disclosure, the shell may be an ultrathin shell having a thickness of about 10 nm or less.

In an embodiment of the present disclosure, the nanosheet may be in contact with the core of the core-shell particle. In an embodiment of the present disclosure, the composite may have a structure in which the core located on the nanosheet is in contact with the nanosheet and the shell encloses the core, but may not be limited thereto. In an embodiment of the present disclosure, the shell may be in contact with each of the core and the nanosheet.

In an embodiment of the present disclosure, the core may absorb visible light, and the shell may absorb ultraviolet light.

In an embodiment of the present disclosure, the core may absorb light in a visible light wavelength band due to a band gap range of the iron oxide. In an embodiment of the present disclosure, the shell may absorb light in an ultraviolet light wavelength band due to a band gap range of the titanium oxide. In general, the ultraviolet light wavelength band ranges from about 10 nm to about 400 nm, and the visible light wavelength band ranges from about 380 nm to about 780 nm.

In an embodiment of the present disclosure, conduction band minimums (CBMs) [E vs NHE(V)] of the cobalt oxide, the iron oxide, and the titanium oxide may gradually increase in the order of the cobalt oxide, the iron oxide, and the titanium oxide. Therefore, electrons may move from the iron oxide to the titanium oxide according to band alignment.

In an embodiment of the present disclosure, valence band maximums (VBMs) [E vs NHE(V)] of the cobalt oxide, the iron oxide, and the titanium oxide may gradually decrease in the order of the cobalt oxide, the iron oxide, and the titanium oxide. Therefore, holes may move from the titanium oxide to the iron oxide and from the iron oxide to the cobalt oxide according to the band alignment.

In an embodiment of the present disclosure, the iron oxide may absorb light in the visible light wavelength band and generate excited electrons and holes, and the holes may move to the valence band maximum (VBM) of the cobalt oxide and the electrons may move to the conduction band minimum (CBM) of the titanium oxide.

In an embodiment of the present disclosure, the titanium oxide may absorb ultraviolet light and generate excited electrons and holes, and the holes may move to the valence band maximum (VBM) of the cobalt oxide and the generated electrons may move to the conduction band minimum (CBM) of the titanium oxide.

In an embodiment of the present disclosure, the nanosheet may serve as a water oxidation site.

In an embodiment of the present disclosure, the holes generated by light absorption of each of the iron oxide and the titanium oxide in the core-shell particle may move to the VBM of the cobalt oxide and oxidize water molecules ($H_2O$) adsorbed to a surface of the nanosheet. The water molecules may be oxidized to generate protons, electrons, and oxygen molecules ($O_2$).

In an embodiment of the present disclosure, the core-shell particle may serve as an oxygen reduction site.

In an embodiment of the present disclosure, the electrons generated by light absorption of each of the iron oxide and the titanium oxide in the core-shell particle may move to the CBM of the titanium oxide and reduce oxygen molecules ($O_2$) adsorbed to a surface of the shell of the core-shell particle. The oxygen molecules may be reduced to generate hydrogen peroxide ($H_2O_2$).

The composite according to the embodiments of the present disclosure includes a nanosheet including a cobalt oxide; and a core-shell particle including an iron oxide and a titanium oxide. The nanosheet serves as a water oxidation site, and the core-shell particle serves as an oxygen reduction site. That is, the reaction sites are specified. Therefore, when the composite is used as a photocatalyst for production of hydrogen peroxide, it exhibits about 10 times higher activity than conventional photocatalysts including single-phase and dual-phase metals.

In an embodiment of the present disclosure, a surface energy range of the iron oxide may be about 1 $J/m^2$ to about 1.5 $J/m^2$, about 1 $J/m^2$ to about 1.4 $J/m^2$, about 1.3 $J/m^2$ to about 1.5 $J/m^2$, or about 1.3 $J/m^2$ to about 1.4 $J/m^2$, but may not be limited thereto.

In an embodiment of the present disclosure, a surface energy range of the titanium oxide may be about 0.5 $J/m^2$ to about 1 $J/m^2$, or about 0.7 $J/m^2$ to about 1 $J/m^2$, but may not be limited thereto.

In an embodiment of the present disclosure, the surface energies of the iron oxide and the titanium oxide may vary depending on the crystal structures and chemical formulas of the iron oxide and the titanium oxide.

In an embodiment of the present disclosure, the surface energy of the iron oxide is higher than that of the titanium oxide. Thus, the iron oxide is chemically unstable compared to the titanium oxide. Therefore, when the iron oxide and the titanium oxide are mixed to form particles, the iron oxide may move to the core and the titanium oxide may move to the shell. Accordingly, the particles may be in the form of core-shell particles.

A second aspect of the present disclosure provides a photocatalyst that includes the composite according to the first aspect.

Detailed descriptions on the second aspect of the present disclosure, which overlap with those on the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, the photocatalyst may be used for production of hydrogen peroxide. In an embodiment of the present disclosure, the photocatalyst may be used to produce hydrogen peroxide as water is oxidized in the nanosheet and oxygen is reduced in the core-shell particle.

In an embodiment of the present disclosure, the photocatalyst includes a triphasic metal oxide-including composite that includes a nanosheet including a cobalt oxide, and a core-shell particle including a core including an iron oxide and a shell including a titanium oxide. The photocatalyst exhibits about 10 times higher photocatalytic activity than conventional photocatalysts including single-phase and dual-phase metals.

In an embodiment of the present disclosure, the photocatalyst has a selectivity of about 100%. In an embodiment of the present disclosure, the photocatalyst may produce hydrogen peroxide ($H_2O_2$) with a selectivity of about 100% in conditions where an oxygen ($O_2$) gas is supplied. In an embodiment of the present disclosure, the selectivity may be calculated according to the equation "(amount of hydrogen peroxide produced after reaction/amount of oxygen participating in reaction)×100".

In an embodiment of the present disclosure, the photocatalyst may exhibit a high activity for hydrogen peroxide production of about 1.6 mmol $H_2O_2$/g·h or more, about 1.67 mmol $H_2O_2$/g·h or more, or about 1.7 mmol $H_2O_2$/g·h or more.

In an embodiment of the present disclosure, the photocatalyst may be used under neutral electrolyte conditions without a sacrificial reagent.

In an embodiment of the present disclosure, the neutral electrolyte conditions may refer to conditions where about 1 M $K_2SO_4$ electrolyte is supplied, but may not be limited thereto.

In an embodiment of the present disclosure, the photocatalyst may have cycle stability. In an embodiment of the present disclosure, even when the photocatalyst is used repeatedly, it can maintain the initial hydrogen peroxide production.

A third aspect of the present disclosure provides a method of preparing a composite including performing hydrothermal reaction of a cobalt ion-containing precursor, an iron ion-containing precursor, and a titanium ion-containing precursor to form a composite, and the composite includes a nanosheet including a cobalt oxide; and a core-shell particle including a core including an iron oxide and a shell including a titanium oxide.

Detailed descriptions on the third aspect of the present disclosure, which overlap with those on the first aspect and the second aspect of the present disclosure, are omitted hereinafter, but the descriptions of the first aspect and the second aspect of the present disclosure may be identically applied to the third aspect of the present disclosure, even though they are omitted hereinafter.

In an embodiment of the present disclosure, the method of preparing a composite may include performing hydrothermal reaction of a solution including a cobalt ion-containing precursor, an iron ion-containing precursor, and a titanium ion-containing precursor to form a composite.

In an embodiment of the present disclosure, the solution may include urea. In an embodiment of the present disclosure, the urea may be bound to the iron ion-containing precursor and the titanium ion-containing precursor to form an initial composite.

In an embodiment of the present disclosure, a temperature range of the hydrothermal reaction may be about 50° C. to about 200° C., but may not be limited thereto. In an embodiment of the present disclosure, the temperature range of the hydrothermal reaction may be about 50° C. to about 200° C., about 50° C. to about 150° C., about 50° C. to about 130° C., about 50° C. to about 110° C., about 50° C. to about 100° C., about 50° C. to about 90° C., about 60° C. to about 200° C., about 60° C. to about 150° C., about 60° C. to about 130° C., about 60° C. to about 110° C., about 60° C. to about 100° C., or about 60° C. to about 90° C., but may not be limited thereto.

In an embodiment of the present disclosure, the hydrothermal reaction may be one-pot reaction, but may not be limited thereto. In an embodiment of the present disclosure, the one-pot reaction may refer to hydrothermal reaction of the solution within one reactor.

In an embodiment of the present disclosure, the preparation method may include forming a solution by sequentially or simultaneously adding the cobalt ion-containing precursor, the iron ion-containing precursor, the titanium ion-containing precursor, and the urea and performing hydrothermal reaction. In an embodiment of the present disclosure, the preparation method may include forming a first solution including the cobalt ion-containing precursor, the iron ion-containing precursor, and the urea, preheating the first solution at a temperature ranging about 50° C. to about 90° C., adding the titanium ion-containing precursor into the first solution to form a second solution, and performing hydrothermal reaction, but may not be limited thereto. In an embodiment of the present disclosure, the titanium ion may react with water in the solution to form a Ti—O bond and then may be bound to the urea and the iron ion-containing precursor to form a composite.

In an embodiment of the present disclosure, the preparation method may include forming an initial triphasic metal composite including cobalt, iron, and titanium and performing co-precipitation of the initial triphasic metal composite to form the composite.

In an embodiment of the present disclosure, the hydrothermal reaction may be performed for about 1 hour to about 72 hours, but may not be limited thereto. In an embodiment of the present disclosure, the hydrothermal reaction may be performed for about 1 hour to about 72 hours, about 1 hour to about 70 hours, about 1 hour to about 60 hours, about 1 hour to about 50 hours, about 1 hour to about 40 hours, about 1 hour to about 35 hours, about 1 hour to about 30 hours, about 1 hour to about 25 hours, about 1 hour to about 24 hours, about 3 hours to about 72 hours, about 3 hours to about 70 hours, about 3 hours to about 60 hours, about 3 hours to about 50 hours, about 3 hours to about 40 hours, about 3 hours to about 35 hours, about 3 hours to about 30 hours, about 3 hours to about 25 hours, about 3 hours to about 24 hours, about 5 hours to about 72 hours, about 5 hours to about 70 hours, about 5 hours to about 60 hours, about 5 hours to about 50 hours, about 5 hours to about 40 hours, about 5 hours to about 35 hours, about 5 hours to about 30 hours, about 5 hours to about 25 hours, about 5 hours to about 24 hours, about 10 hours to about 72 hours, about 10 hours to about 70 hours, about 10 hours to about 60 hours, about 10 hours to about 50 hours, about 10 hours to about 40 hours, about 10 hours to about 35 hours, about 10 hours to about 30 hours, about 10 hours to about 25 hours, about 10 hours to about 24 hours, about 15 hours to about 72 hours, about 15 hours to about 70 hours, about 15 hours to about 60 hours, about 15 hours to about 50 hours, about 15 hours to about 40 hours, about 15 hours to about 35 hours, about 15 hours to about 30 hours, about 15 hours to about 25 hours, about 10 hours to about 24 hours, about 20 hours to about 72 hours, about 20 hours to about 70 hours, about 20 hours to about 60 hours, about 20 hours to about 50 hours, about 20 hours to about 40 hours, about 20 hours to about 35 hours, about 20 hours to about 30 hours, about 20 hours to about 25 hours, or about 20 hours to about 24 hours, but may not be limited thereto.

In an embodiment of the present disclosure, the co-precipitation may be performed about 1 hour or more, about 2 hours or more, or about 3 hours or more after the hydrothermal reaction starts.

In an embodiment of the present disclosure, the cobalt ion-containing precursor may be a salt containing cobalt bivalent ions, but may not be limited thereto. For example, the cobalt ion-containing precursor may include at least one selected from cobalt nitrate, $CoCl_2$, and $CoSO_4$, but may not be limited thereto. In an embodiment of the present disclosure, the cobalt ion-containing precursor may be a hydrate.

In an embodiment of the present disclosure, the iron ion-containing precursor may be a salt containing trivalent iron ions, but may not be limited thereto. For example, the iron ion-containing precursor may include at least one selected from iron nitrate and $FeCl_3$, but may not be limited thereto. In an embodiment of the present disclosure, the iron ion-containing precursor may be a hydrate.

In an embodiment of the present disclosure, the titanium ion-containing precursor may be a salt containing tetravalent titanium ions, but may not be limited thereto. For example, the titanium ion-containing precursor may include titanium tetrachloride ($TiCl_4$), but may not be limited thereto.

The method of preparing a composite according to the embodiments of the present disclosure may induce phase separation between the nanosheet and the core-shell particle by controlling an oxidation number of the metal ion precursor in the solution during the hydrothermal reaction. In an embodiment of the present disclosure, as the hydrothermal reaction proceeds, the oxidation number of the metal ion precursor may change. The oxidation number can be regulated depending on the reaction time. In an example, $Fe^{3+}$ ions and $Ti^{4+}$ ions in the initial hydrothermal reaction may be reduced to $Fe^{2+}$ ions and $Ti^{3+}$ ions, respectively, as the hydrothermal reaction proceeds, and the $Fe^{2+}$ ions, which are chemically unstable, may move to the core.

In an embodiment of the present disclosure, an average oxidation number of the cobalt ion may be about 0.67 or more, but may not be limited thereto. In an embodiment of the present disclosure, an average oxidation number of the cobalt ion in the solution may be about 0.67 or more, but may not be limited thereto. In an embodiment of the present disclosure, if the average oxidation number of the cobalt ion in the solution is about 0.67 or more, bivalent cobalt (Co) ions may be generated and a cobalt hydroxide carbonate phase may be formed. In an embodiment of the present disclosure, the cobalt hydroxide carbonate phase may be formed as a nanosheet.

The method of preparing a composite according to the embodiments of the present disclosure may automatically form a core-shell particle including a core including an iron oxide and a shell including a titanium oxide due to a difference in surface energy between the iron oxide and the titanium oxide.

In an embodiment of the present disclosure, the method may further include stabilization of the core-shell particle. In an embodiment of the present disclosure, the stabilization of the core-shell particle may include forming the core-shell particle as the titanium oxide moves to the outer side of the particle and forms a shell.

In an embodiment of the present disclosure, the preparation method may form the shell of the core-shell particle as an ultrathin shell having a thickness of about 1 nm to about 10 nm.

In an embodiment of the present disclosure, the method of preparing a composite may form a core-shell particle when a particle in which the iron oxide and the cobalt oxide are mixed is generated on the nanosheet and after a predetermined period of time, the titanium oxide having relatively low surface energy moves to the outer side of the particle due to a difference in surface energy between the iron oxide and the cobalt oxide to form a shell.

Hereinafter, example embodiments are described in more detail by using Examples, but the present disclosure may not limited to the Examples.

EXAMPLES

1. Experiments

Preparation of Photocatalysts

CT was synthesized by hydrothermal methods under aqueous urea solution. At first, an aqueous solution (40 mL of total solution) of urea (1CT g, 0.416 M) and cobalt nitrate hexahydrate (0.374 g) was pre-heated in the Teflon-made vessel at 60° C. Next, Titanium tetrachloride (23.5 μL) was added to a pre-heated solution in a drop-wise manner. After all precursors were mixed in the Teflon-made vessel with a stainless-steel autoclave, the autoclave was put in oven for 24 h at 90° C. For CFT, aqueous solution (40 mL of total solution) of cobalt nitrate hexahydrate (0.312 g) and iron nitrate nonahydrate (0.087 g) were substituted with that of cobalt nitrate hexahydrate. Next, Titanium tetrachloride (23.5 μL) was added to a pre-heated solution in a drop-wise manner. After all precursors were mixed in the Teflon-made vessel with a stainless-steel autoclave, the autoclave was put in oven for 24 h at 90° C. For CF, an aqueous solution (40 mL of total solution) of urea (1 g, 0.416 M), cobalt nitrate hexahydrate (0.312 g) and iron nitrate nonahydrate (0.173 g) was pre-heated in the Teflon-made vessel at 60° C. After all precursors were mixed in the Teflon-made vessel with a stainless-steel autoclave, the autoclave was put in oven for 24 h at 90° C. For FT, aqueous solution (40 mL of total solution) of urea (1 g, 0.416 M) and iron nitrate nonahydrate (0.303 g) was pre-heated in the Teflon-made vessel at 60° C. Next, Titanium tetrachloride (82.2 μL) was added to a pre-heated solution in a drop-wise manner. After all precursors were mixed in the Teflon-made vessel with a stainless-steel autoclave, the autoclave was put in oven for 24 h at 90° C. For $Co_2(OH)_2CO_3$, an aqueous solution (40 mL of total solution) of urea (1 g, 0.416 M) and cobalt nitrate hexahydrate (0.437 g) was pre-heated in the Teflon-made vessel at 60° C. After all precursors were mixed in the Teflon-made vessel with a stainless-steel autoclave, the autoclave was put in oven for 24 h at 90° C. The produced solution was centrifuged several times at 6000 rpm for 10 min with water and ethanol. Next, the centrifuged powder was dried at 60° C. in a vacuum oven overnight.

Preparation of the Photocathode

The PEC electrodes were fabricated by the powder transfer method. Firstly, 20 mg of the photocatalyst was suspended in 1 mL isopropanol. The prepared suspension was dispersed by ultrasonication for 30 min and then the dispersed suspension was deposited on a 2×2 glass substrate. The photocatalyst deposited glass was dried for overnight under room temperature. Subsequently, Au layers having 300 nm thickness were deposited under high vacuum using thermal evaporator with the deposition rate of 1 Å/s to 1.5 Å/s. Finally, Au film holding the particulate photocatalysts was touched each other with the other carbon tape attached on the glass plate (about 2×2 cm) and then lifted off the glass plate. The separated PEC electrode was ultrasonicated for 1 hour to remove excess powder.

Structural Characterizations

The transmission electron microscopy (TEM) images were obtained with a JEM-ARM200F model (JEOL Ldt., Japan) and the Cs-corrected scanning TEM (STEM) measurements have been performed for the energy dispersive X-ray spectrometer (EDS) mapping images using a BRUKER QUANTAX EDS. Also, the powder X-ray diffraction (PXRD) data were obtained using a SmartLab ν-2ν diffractometer (Rigaku, Japan) operated in the reflectance Bragg-Brentano geometry with a Johansson type Ge (111) monochromator filtering the Cu Kα1 radiation at a power of 1200 W (40 kV, 30 mA). The diffractometer was equipped with a high speed 1D detector (D/teX Ultra) scanning from 3° to 70° with a 0.02 step size. Besides, the Fourier transform-infrared (FT-IR) spectra were collected with the ATR using FT-TR-6100 from JASCO with a range of 600 $cm^{-1}$ to 4000 $cm^{-1}$. The XPS spectra were gained by using the K-alpha instrument (Thermo Scientific) equipped with the Al Kα micro-focused X-ray monochromator (1487 eV). Additionally, the in situ and ex situ synchrotron X-ray measurements were conducted in 10 C beamline at Pohang Accelerator Laboratory (PAL, Republic of Korea), where a calibration of each metal K-edge spectrum was accomplished by employing the reference spectrum from the corresponding each metal foil. To design the in situ XAS system, the photochemical cell was prepared with electrolyte, $O_2$ gas bubbling, and polyimide window under illumination. The samples were fabricated using the powder transfer method. Besides, the Raman spectrum was analysed by the Raman microscope (ARAMIS, Horiba Jobin Yvon) with the Ar-ion continuous wave Laser. The charge carrier lifetime and photoluminescence data were also measured by the time-correlated single photon counting (TCSPC) (FL920, Edinburgh Instruments) method. The UV-Vis spectrum was gained using a V-570 UV-vis spectrometer (Jasco, Japan) and the EPR data were obtained at room temperature operating in the standard frequency range 8.75 GHz to 9.65 GHz at a power of 5 mW (JOEL FA-200 spectrometer).

$O_2$ and $H_2O_2$ Adsorption Measurements

First, $O_2$ adsorption isotherm analyses were measured using a BELSORP-mini II. Besides, for $H_2O_2$ adsorption measurements, 50 mg of samples was put into 10 mL of 1 M $H_2O_2$ solution for 24 h at room temperature under vigorous stirring (around 500 rpm) to adsorb $H_2O_2$ on samples. After adsorption stage, the solution was centrifuged three times at 6000 rpm for 10 min with DI water before drying in the vacuum oven for 2 h. And then, same amount of dried samples are dispersed in 3 mL of DI water by ultrasonication and mixed with 1 mL of 0.1 M hydrogen phthalate ($C_8H_5PO_4$) aqueous solution and 1 mL of 0.4 M potassium iodide (KI) aqueous solution for 1 h under 500 rpm stirring. The proceeded solution is centrifuged to avoid disturbances caused by samples, and only clear solution was taken for UV-VIS measurement for determining the amount of $H_2O_2$.

Photocatalytic Activity Measurement

A closed system for photocatalytic $H_2O_2$ production was built using a self-designed quartz reactor with an aqueous photocatalyst solution (0.1 g/L). Then, the reactor was purged using the $O_2$ gas for 30 min. Next, the reactor was illuminated with a 300 W xenon lamp having the fitted IR blocking filter (100 $mW/cm^2$). The apparent quantum yields for $H_2O_2$ conversion were obtained by the following Equation 1:

$$AQY(\%) = \frac{2 \times [H_2O_2](\text{mol})}{\text{Photon number in the reactor (mol)}} \times 100 \quad \text{[Equation 1]}$$

Amount of $H_2O_2$ Determination

The amount of produced $H_2O_2$ was measured through iodometric titration. $H_2O_2$ generates triiodide ions ($I^{3-}$) in the presence of iodide ion ($I^-$) and hydrogen phthalate ($C_8H_5PO_4$) aqueous solution. Therefore, 3 mL of clear solution after photocatalytic reaction were mixed with 1 mL of 0.1 M hydrogen phthalate ($C_8H_5PO_4$) aqueous solution and 1 mL of 0.4 M potassium iodide (KI) aqueous solution for 2 h under darkness. And the color-changed solution were measured by UV-VIS for finding the peaks at around 350 nm indicating $I^{3-}$ produced from $H_2O_2$.

Isotope-Labelling Experiment

The isotopically-labelled $H_2{}^{18}O$ experiments were carried out to trace the source of $O_2$ on photocatalytic water oxidation. The closed system for photocatalytic water oxidation was also achieved using designed quartz reactor, where 10 mg of photocatalysts were dispersed in 4 mL $H_2{}^{16}O$ and 1 mL $H_2{}^{18}O$. In addition, the reactor was purged with $O_2$ gas for 30 min to fill the reactor with only $O_2$ gas. The photocatalytic reaction was also conducted with a 300 W xenon lamp having the fitted IR blocking filter. Moreover, the evolved 180 containing gas in the dead volume of a reactor was injected in the GC-MS (Agilent, GC-7890A and MS-5975C) equipped with a capillary column (Supleco, 30 m×0.32 mm) and MSD (Mass selective detector, inert triple-axis detector) for the identification of m/z 36.

Photoelectrochemical Property Measurement

All photoelectrochemical measurements were performed by using the PINE Instrument Quartz Photoelectrochemical Cell kit to the potentiostat (Biologic SP-240). The Pt counter electrode and Ag/AgCl reference electrode were used to measure photoelectrochemical oxygen reduction properties. An aqueous electrolyte of 1 M $K_2SO_4$ (pH 7) was continuously purged with $O_2$ gas (99.999%) during reaction. 300 W Xe arc lamp (ORIEL) attached with NEWPORT liquid (infra-red light) filter, light shaping diffuser (homogenizer), and various filter were used for a light irradiation and intensity of light is one sun condition (100 mW/cm$^2$). The scan rate of the photocurrent-voltage curve was 10 mV/s.

Computational Details

We performed the plane-wave density functional theory (DFT) calculations using Vienna Ab-initio Simulation Package. All calculations were spin-polarized and the kinetic energy cutoff was set as 400 eV. The projector-augmented wave method was used, where Ti 3s, 3p, 3d electrons, Fe 3d electrons and Co 3d electrons were included as valence electrons. To reproduce the experimental band gap, we included Hubbard U corrections using $U_{eff}$=8.5 eV for Ti 3d, and $U_{eff}$=6.0 eV for Fe 3d while $U_{eff}$=6.1 eV for Co 3d was used based on the previous literature due to, to our best knowledge, the absence of band gap measurement. We chose (220) surface for $Fe_3O_4$, (101) surface for anatase-$TiO_2$, and (110) surface for rutile-$TiO_2$, which are stable low-index surfaces. For $Co_2(OH)_2CO_3$, we calculated surface formation energies via DFT calculations, and used (100) surface having the most stable surface formation energy. The reciprocal space was sampled using 1-centred (2×5×1) mesh for 4-layer anatase-$TiO_2$ (101) surface, (7×3×1) mesh for 6-layer rutile-$TiO_2$ (110) surface, (2×3×1) mesh for 4-layer $Fe_3O_4$ (220) surface, and (2×6×1) mesh for $Co_2(OH)_2CO_3$ (100) surface. A vacuum region was included to avoid cell-to-cell interaction and a dipole correction was made along the perpendicular direction to the surface slab. The surface formation energy was calculated using the relation of by the following Equation 2:

$$\gamma = \frac{1}{2A}(E_{slab} - NE_{bulk}) \quad \text{[Equation 2]}$$

with γ is the surface formation energy, A is the area of the slab, $E_{slab}$ is the DFT energy of the slab, $E_{bulk}$ is the DFT energy of the bulk per atom, and N is the number of atoms in the slab.

2. Results and Discussion

Figure 1B:
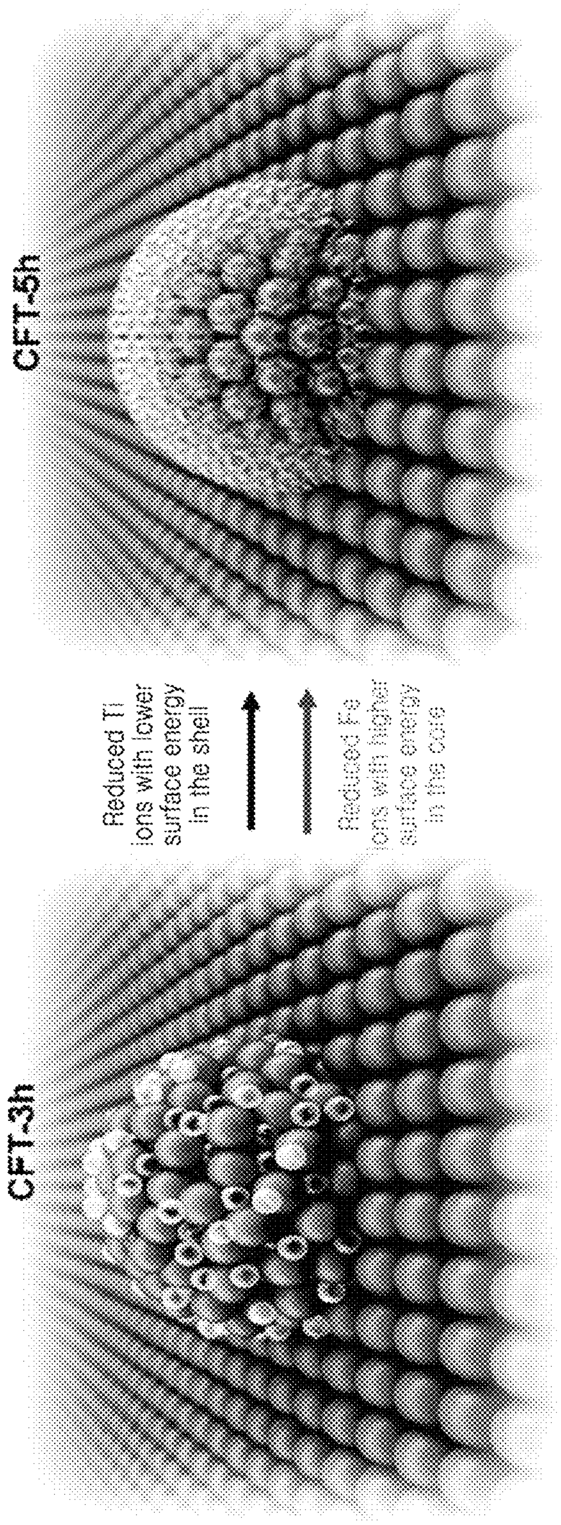
Figure 1C:
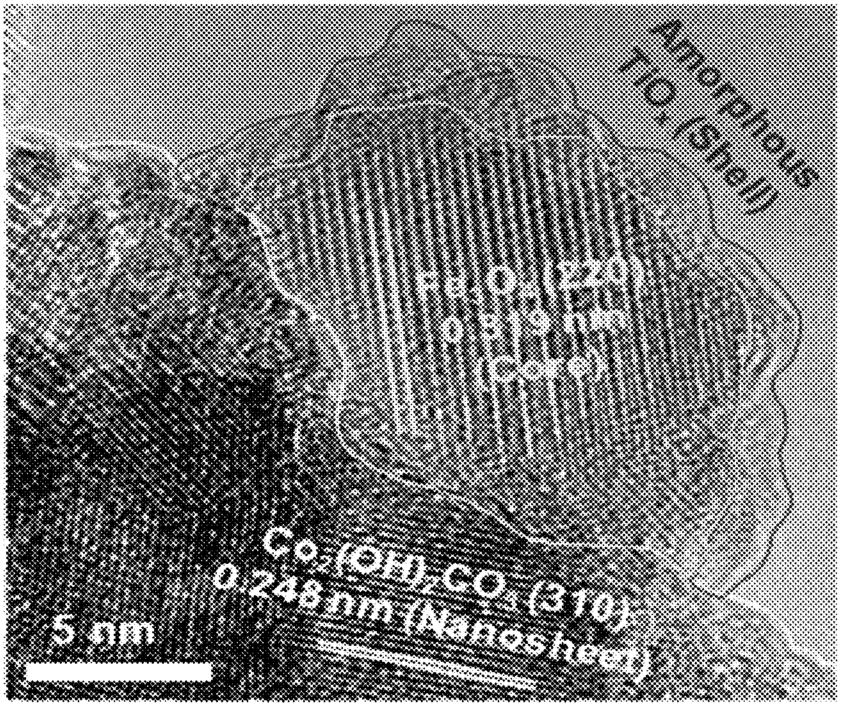
Figure 1D:
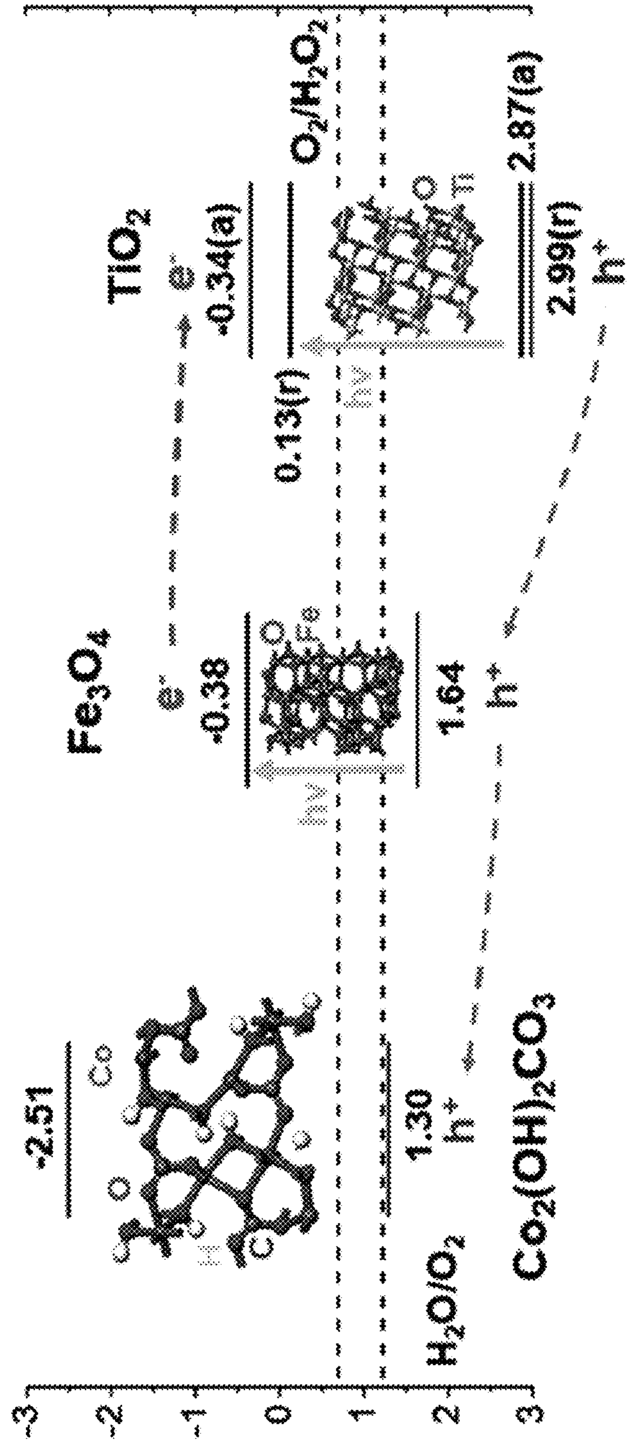
Figure 2A:
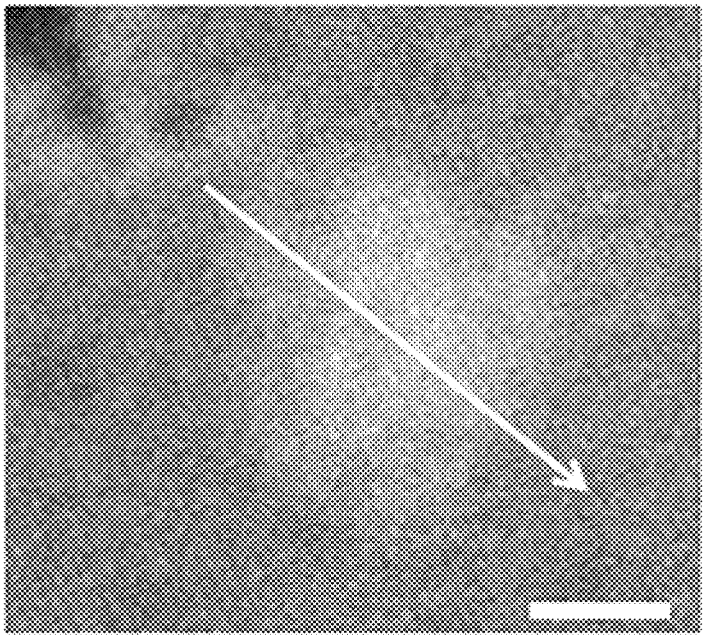
FIG. 2A to FIG. 2D show characterization of CFT-3h according to an example of the present disclosure.
Figure 2B:
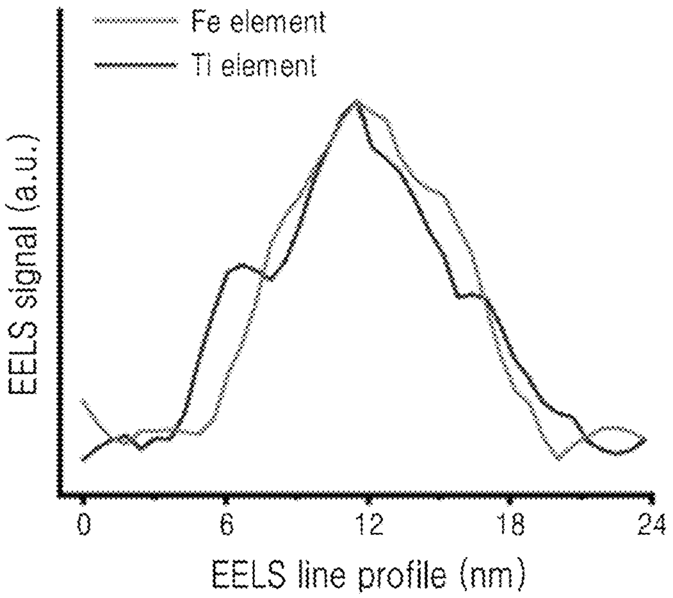
Figure 2C:
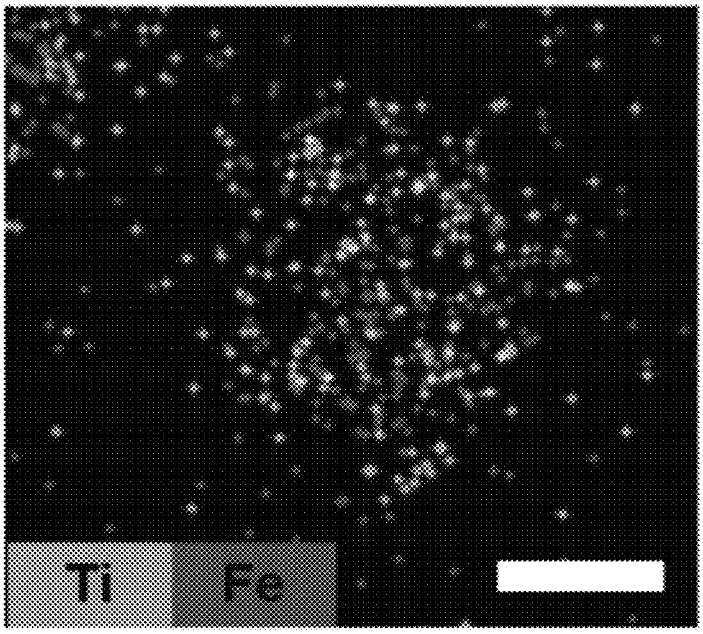
Figure 2D:
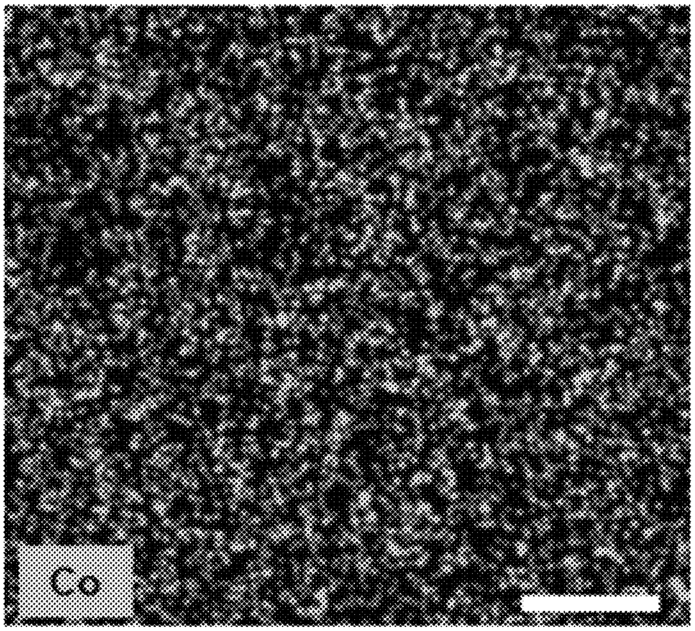
Figure 3:
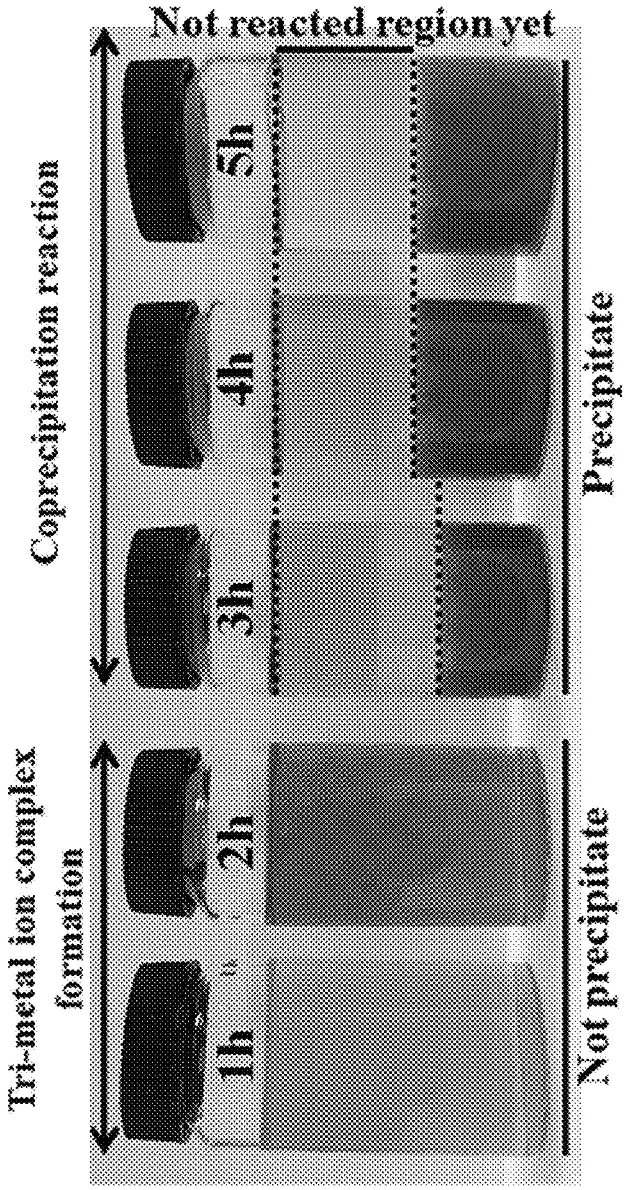
FIG. 3 shows a photograph of CFT according to the reaction time according to an example of the present disclosure.
Figure 4A:
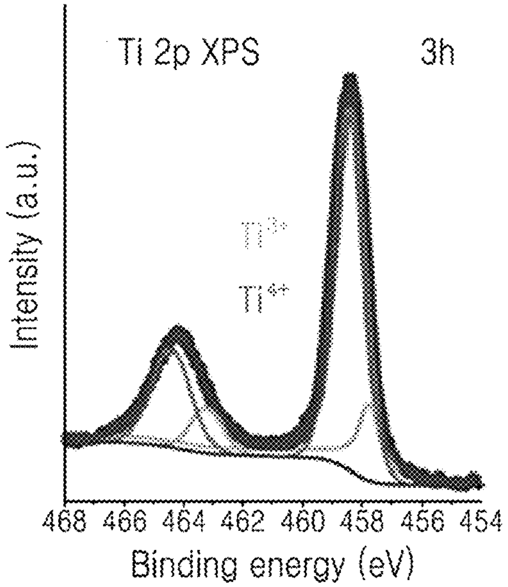
FIG. 4A(i) to FIG. 4A(iii), and FIG. 4B(i) to FIG. 4B(iii) show Ti 2p (FIG. 4A(i) to FIG. 4A(iii)) and (FIG. 4B(i) to FIG. 4B(iii)) Fe 2p X-ray photon spectroscopy (XPS) peaks for CFT-3h, CFT-4h, and CFT-5h according to an example of the present disclosure.
Figure 4A:
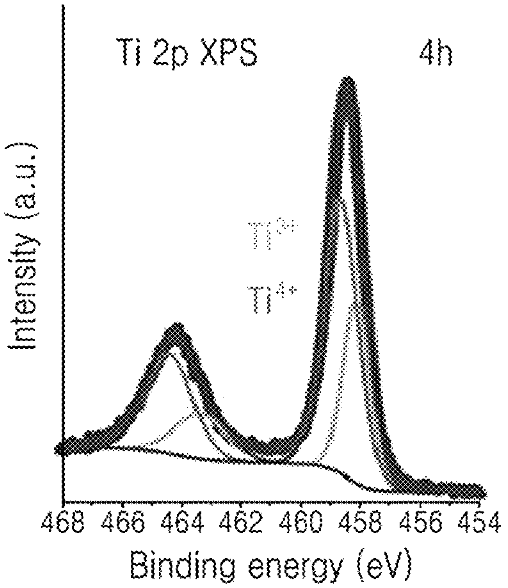
Figure 4A:
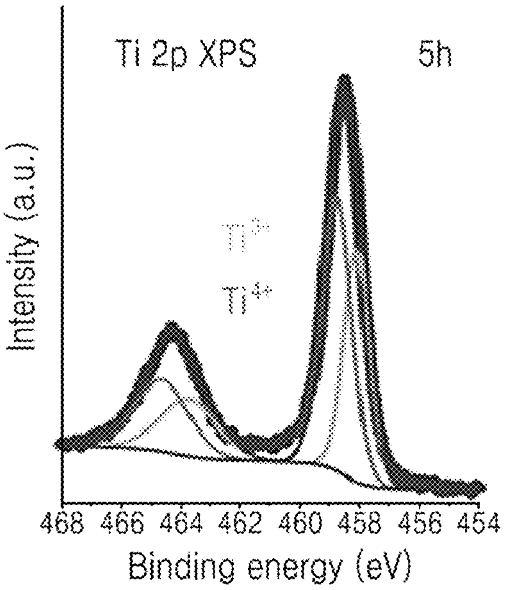
Figure 4B:
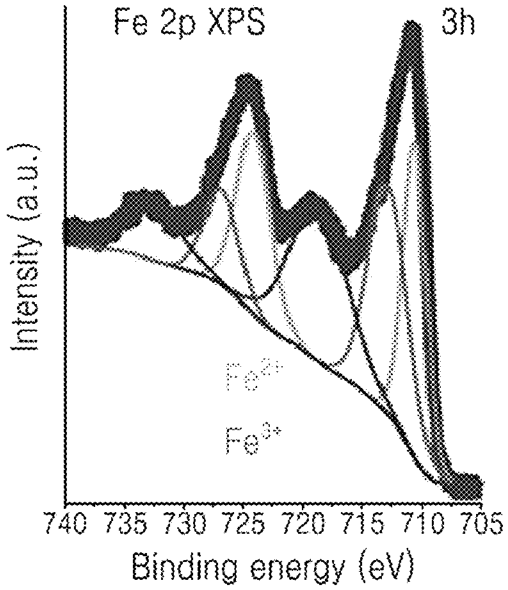
Figure 5B:
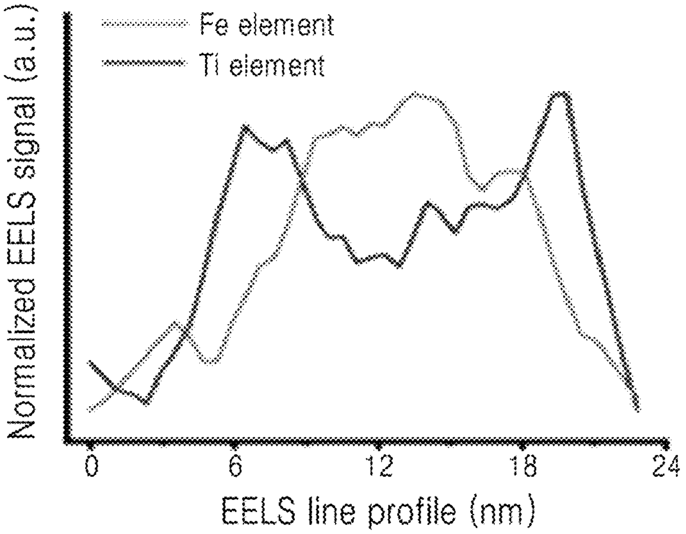
Figure 5C:
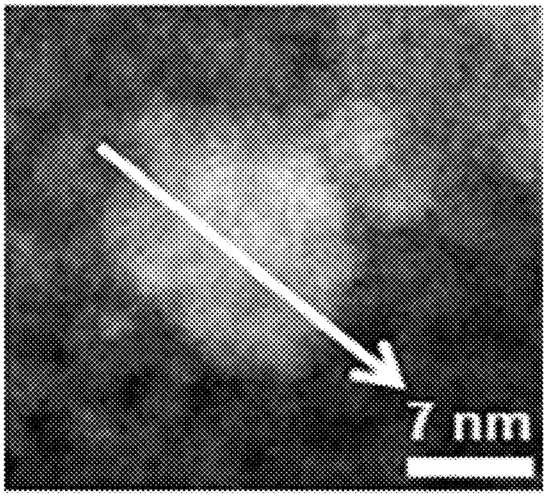
Figure 5D:
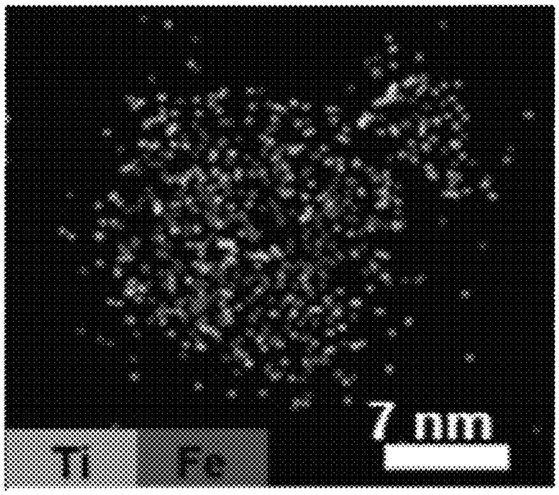
Figure 5E:
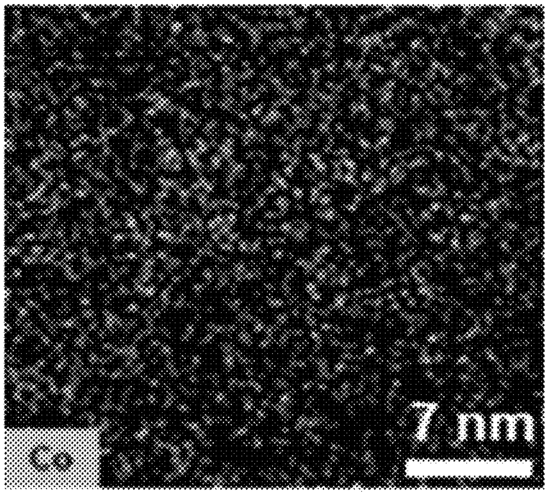
Figure 6A:
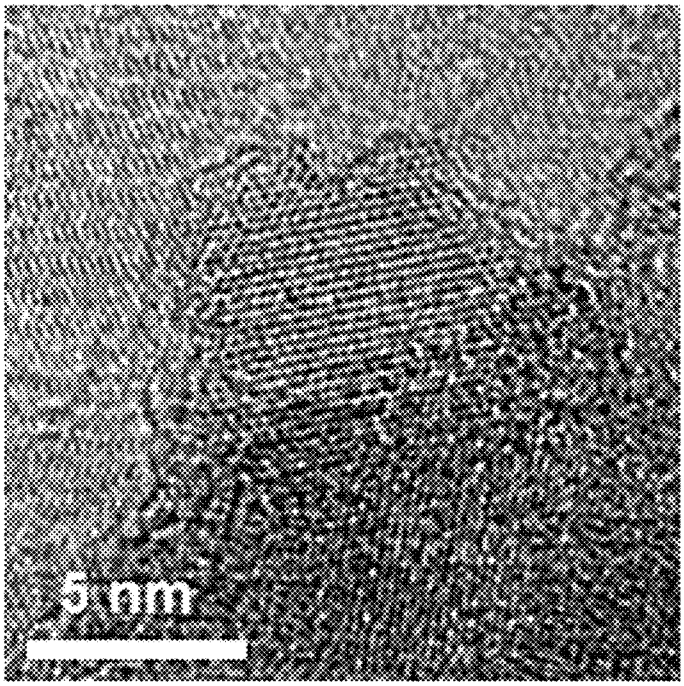
FIG. 6A and FIG. 6B show HR-TEM images of two different CFT photocatalysts according to an example of the present disclosure.
Figure 6B:
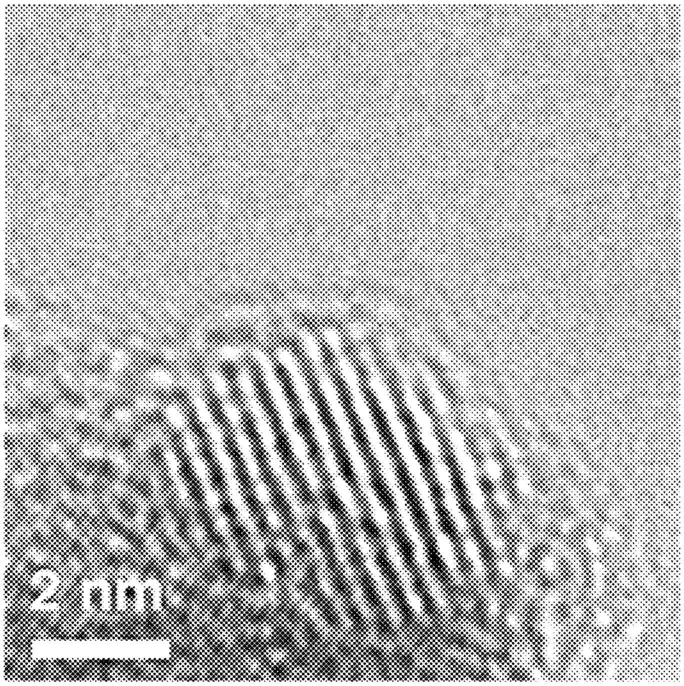
Figure 7A:
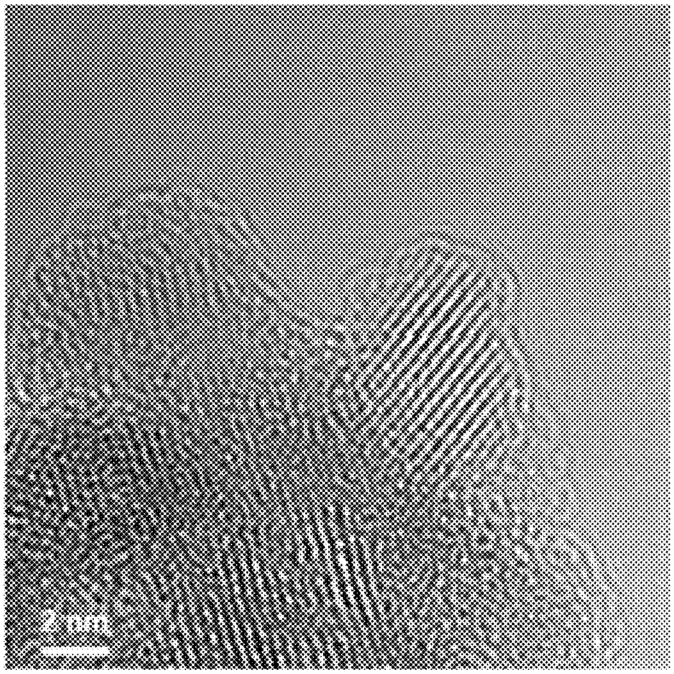
FIG. 7A and FIG. 7B show (FIG. 7A) HR-TEM image and (FIG. 7B) TEM image of iron oxide core-titanium oxide shell (denoted as "FT") according to an example of the present disclosure, where amorphous phase layers are covered on the edges of nanoparticles, similar to those for CFT.
Figure 7B:
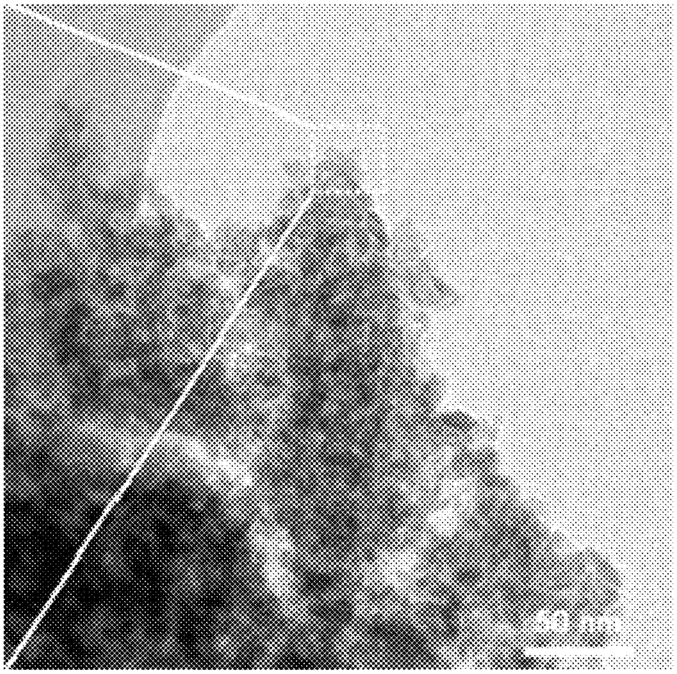
Figure 8A:
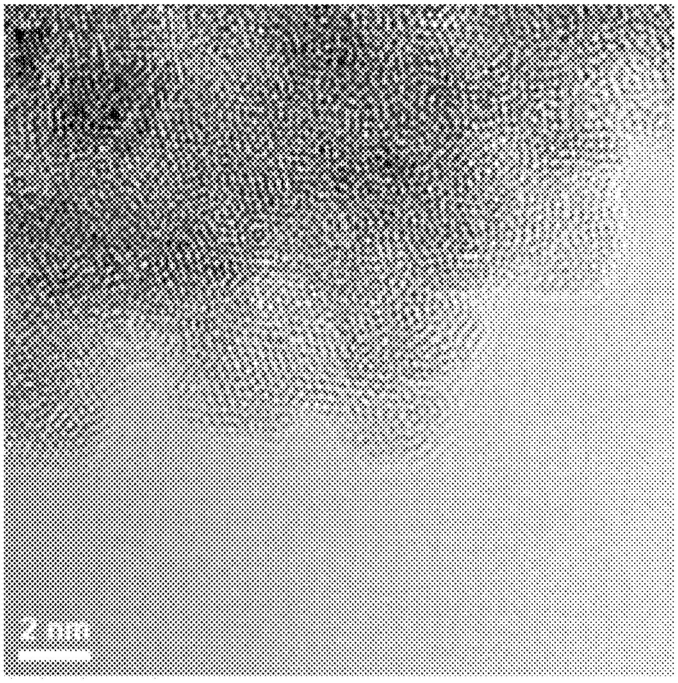
FIG. 8A and FIG. 8B show (FIG. 8A) HR-TEM image and (FIG. 8B) TEM image of cobalt oxide and iron oxide (denoted as "CF") according to an example of the present disclosure, where crystalline nanoparticles are shown to be synthesized on cobalt carbonate hydroxide nanosheets.
Figure 8B:
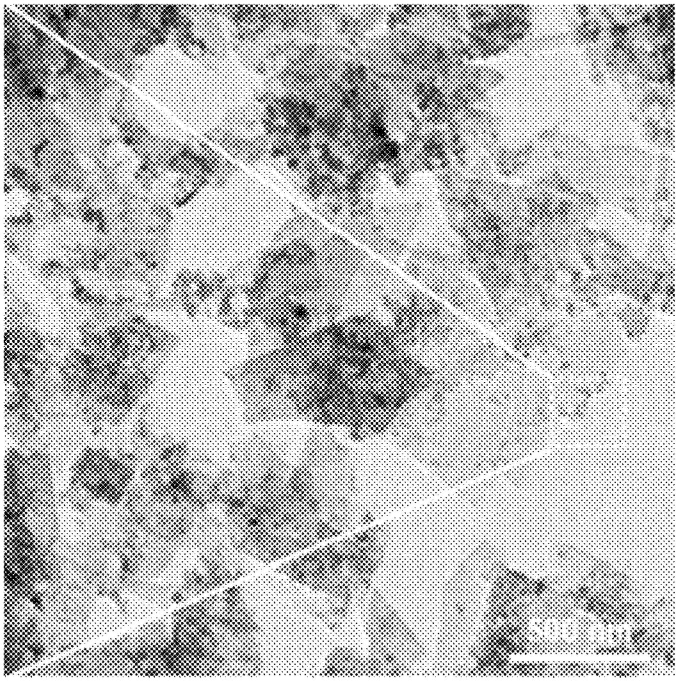

The triphasic metal oxide photocatalyst with cobalt hydroxide carbonate, visible (Vis) light-absorbing iron oxide, and ultraviolet (UV) light-absorbing titanium oxide phases (denoted as CFT) for efficient water oxidation, electron/hole transfer, and oxygen reduction is depicted in FIG. 1A, and it was synthesized in one pot via a hydrothermal co-precipitation method. First, the phase of a product was controlled by adjusting the ratios of the oxidation numbers of metal ion precursors in an aqueous urea solution. For $0.2<M^{2+}$ ratios<0.67, it led to a layered double hydroxide (LDH) phase [11] with carbonate ions forming the anion layers to balance the charges in cationic metal layers, but we find that it suffers from the hole-induced $H_2O_2$ decomposition. On other hand, for $M^{2+}>0.67$, divalent metal ions were precipitated from trivalent and tetravalent ions and then formed a metal hydroxide carbonate phase. First, divalent Co ions were employed to allow efficient water oxidation reaction (WOR) and they led to a cobalt hydroxide carbonate phase. The Fe and Ti ions were added into Co ions to allow simultaneously Vis and UV light absorptions by forming nanoparticle structures on a cobalt hydroxide carbonate nanosheet. These Co, Fe, and Ti ions led to a triphasic metal oxide photocatalyst. The high angle annular dark field (HAADF)-scanning transmission electron microscopy (STEM) image of CFT (FIG. 2A) reveals the Fe and Ti nanoparticles formed on cobalt hydroxide carbonate nanosheets, while the STEM-electron energy loss spectroscopy (EELS) line profile (FIG. 2B) and STEM-energy dispersive X-ray spectroscopy (EDS) mapping images (FIGS. 2C and 2D) verify the homogeneous distribution of Fe and Ti ions in CFT-3h from the photographs of photocatalysts prepared with different reaction times (denoted as CFT-xh) in FIG. 3. A CFT photocatalyst was formed via the co-precipitation reaction after 3 hours, although it was not constructed with a reaction time of 2 hours (FIG. 3). More specifically, in the hydrothermal synthestatic reaction, metal ions complex are formed in the 1 h to 2 h reaction time. After 3h, co-precipitated powders are formed and sinked down to the vial. The remaining purple color solution contains Co' ions. The Ti 2p X-ray photon spectroscopy (XPS) spectra reveal the deconvoluted peaks centered at approximately 457.6 eV, 463.2 eV, 458.7 eV, and 464.5 eV for $Ti^{3+}2p_{3/2}$, $Ti^{3+}2p_{1/2}$,$Ti^{4+}2p_{3/2}$ and $Ti^{4+}2p_{1/2}$, respectively. Similarly, the Fe 2p XPS spectra show that Fe ions give the deconvoluted peaks at approximately 709.0 eV, 722.6 eV, 711.0 eV and 724.4 eV for $Fe^{2+}2p_{3/2}$, $Fe^{2+}2p_{1/2}$, $Fe^{3+}2p_{3/2}$ and $Fe^{3+}2p_{1/2}$, respectively. The Ti 2p and Fe 2p XPS peaks for CFT-3h (FIG. 4A(i) to FIG. 4A(iii), and FIG. 4B(i) to FIG. 4B(iii)) also verify that Fe and Ti elements have the same oxidation numbers as those for metal precursors. FIG. 1B illustrates the formation mechanism of a core-shell structure. The density functional theory (DFT) calculations support that the surface energies of 0.78 J/m$^2$ for anatase-$TiO_2$ (101) and 0.93 J/m$^2$ for rutile-$TiO_2$ (110) are smaller than that of 1.39 J/m$^2$ for $Fe_3O_4$ (220), supporting that the core-shell structure could be constructed by stabilizing $Fe_3O_4$ in the core and $TiO_2$ in the shell. Besides, FIG. 4A(i) to FIG. 4A(iii), and FIG. 4B(i) to FIG. 4B(iii)support the core-shell stabilization that Ti and Fe ions are reduced from $Ti^{4+}$ and $Fe^{3+}$ to $Ti^{3+}$ and $Fe^{2+}$, and that chemically unstable $Fe^{2+}$ ions lead to ion diffusion towards the core region. The HR-TEM image (FIG. 1C) shows the existence of $Fe_3O_4$ (220) and $Co_2(OH)_2CO_3$ (310) planes corresponding to the lattice fringes of 0.389 nm and 0.248 nm. Moreover, the TEM image for the tri-phase photocatalyst (FIG. 5A), STEM-EELS line profiles (FIG. 5B) obtained across the arrow in the HAADF-STEM image of CFT-5h (FIG. 5C), and STEM images and EDS mapping images (FIG. 5D and FIG. 5E) clarify the presence of titanium ions in the shell region and Fe ions in the core region. These support that the triphasic metal oxide photocatalyst results from phase control and core-shell stabilization. Additionally, the HR-TEM images of two different photocatalysts support the iron oxide core-titanium oxide shell morphologies for CFT (FIG. 6A and FIG. 6B). Moreover, the iron oxide core-titanium oxide shell (denoted as FT) structure with an ultrathin amorphous layer (FIG. 7A and FIG. 7B) was derived under the urea hydrolysis reaction conditions. FIG. 8A and FIG. 8B reveal that Co oxide and iron oxide were phase-separated under the synthesis condition without Ti ions (denoted as CF). The DFT calculations of CFT (FIG. 1D) give the band gaps of 2.02 eV for $Fe_3O_4$ and about 3 eV for $TiO_2$ (2.86 eV for rutile $TiO_2$, 3.21 eV for anatase $TiO_2$), which are consistent with previous results. Also, the band gap of 3.80 eV is obtained for cobalt hydroxide carbonate. These band gaps explain Vis-to-UV light absorptions and charge transfer. The DFT calculations definitely show that the photogenerated electrons at the iron oxide site can transfer to the conduction band minimum (CBM) of the titanium oxide site, while the photogenerated hole at the iron oxide site can move towards the valence band maximum (VBM) of the cobalt hydroxide carbonate site. At the same time, ultraviolet absorbed titanium oxide also induces excited electrons and holes subsequently transferred to CBM of the titanium oxide site to reduce oxygen molecules and VBM of the cobalt hydroxide carbonate site to oxidize water, indicating that the electron-hole pairs produced at CFT can be separated to electrons and holes through the core-shell structure. The UV-Visible spectra show that CFT, CT and $Co_2(OH)_2CO_3$ have the similar absorption shapes indicating the similar band gap energy resulted from $Co_2(OH)_2CO_3$, while CFT has a higher light absorption intensity at around 350 nm. This demonstrates that Fe oxide core-Ti oxide shell structure of CFT leads to more efficient light absorption than CT or $Co_2(OH)_2CO_3$.

Figure 9A:
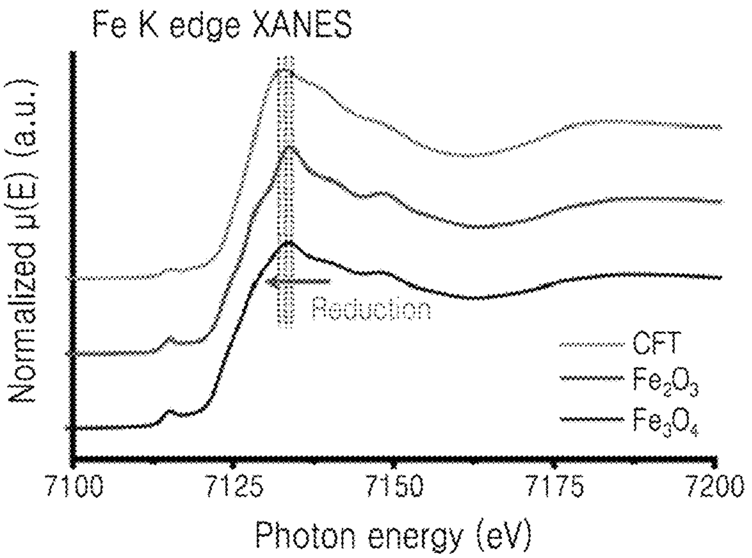
FIG. 9A to FIG. 9G show structure characteristics of dual-phase and triphasic metal oxide photocatalysts according to an example of the present disclosure.
Figure 9B:
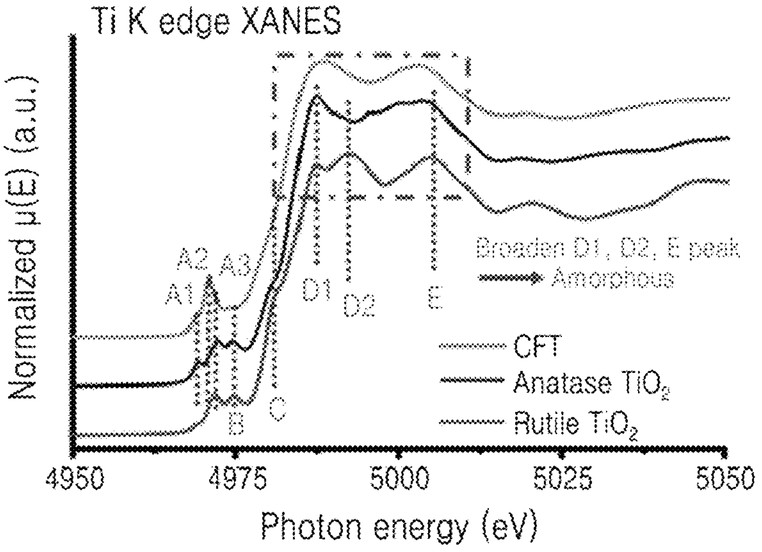
Figure 9C:
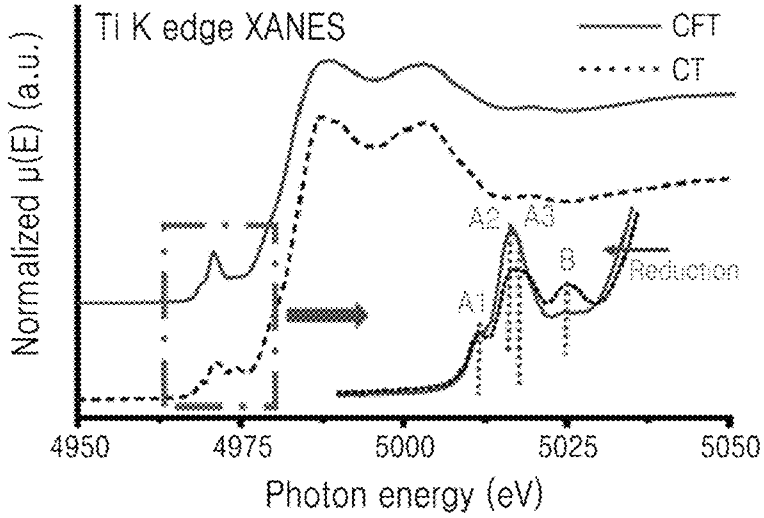
Figure 9D:
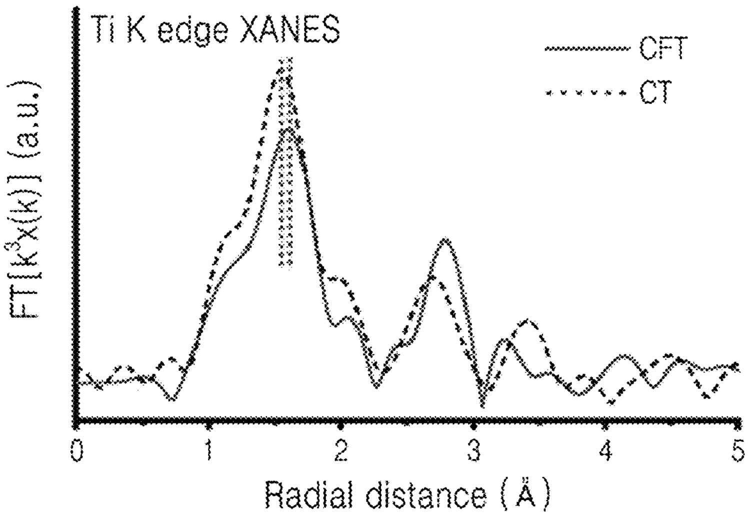
Figure 9E:
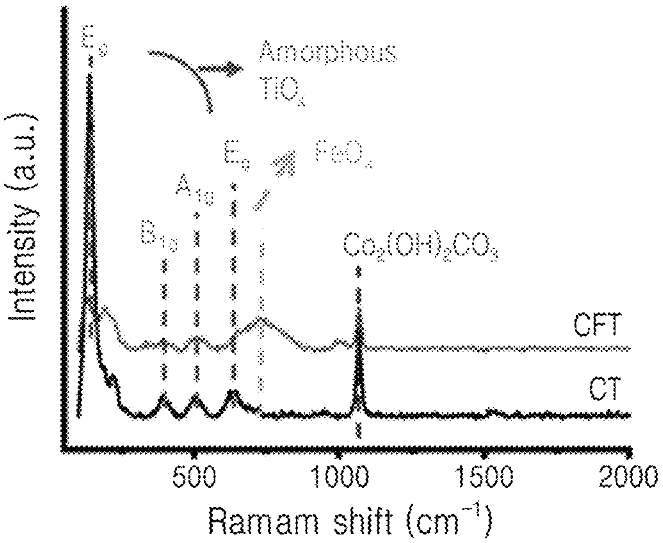
Figure 9F:
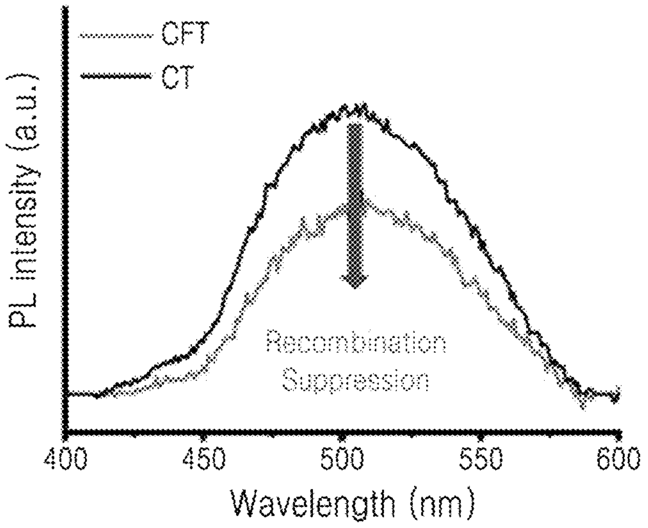
Figure 9G:
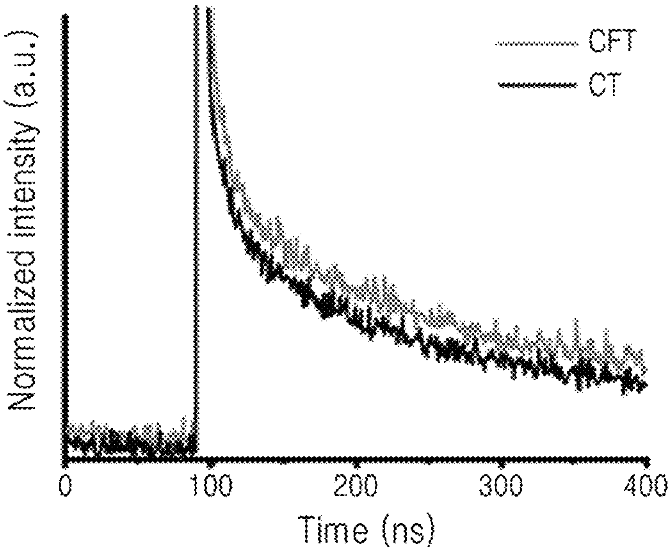

The crystal structures and chemical bonding states for the photocatalysts were elucidated through the powder X-ray diffraction (PXRD) and Fourier transform infrared (FTIR) spectroscopy analyses. The PXRD peaks, which are indexed based on phase reflections (JCPDS card no. 29-1416), demonstrating that triphasic CFT and dual-phasic CT photocatalysts have those for a monoclinic cobalt hydroxide carbonate ($Co_2(OH)_2CO_3$) phase. On the other hand, the main FTIR spectra for CFT and CT are shown to be similar since both have a cobalt hydroxide carbonate phase. Therefore, the Fe and Ti K-edge X-ray absorption spectroscopy (XAS) analyses are carried out to elucidate the local electronic structures around Fe and Ti elements. FIG. 9A reveals the Fe K-edge X-ray absorption near-edge spectroscopy (XANES) spectra relative to $Fe_2O_3$ and $Fe_3O_4$ as references. The Fe oxide-containing CFT photocatalyst shows the similar spectra to those for $Fe_3O_4$, but its absorption edge at 7132 eV, which is blue-shifted by 1 eV compared to that for $Fe_3O_4$, verifies the reduced Fe ions generated after the core-shell stabilization. Extended X-ray absorption fine structure spectroscopy (EXAFS) spectra for CFT verify that the radial distances for the first (Fe—O bond) and second shells (Fe—Fe bond) are similar to those for $Fe_3O_4$. These support that the iron oxide phase with more reduced Fe ions is formed in the core region of CFT. Moreover, the Ti K-edge XANES and EXAFS spectra (FIG. 9B) show a notable feature at the pre-edge region (approximately 4970 eV). Four characteristic peaks denoted as A1, A2, A3 and B were observed in the pre-edge region, which can be explained by the multiple scattering theory based on the configuration-interaction model in anatase $TiO_2$ or rutile $TiO_2$. A1 and B can be assigned to the quadrupole transition (Ti 1s→Ti 3d) and dipole transition (Ti 1s→Ti 4p). Also, the quadrupole and dipole transitions are allowed due to 3d/4p mixing resulting in A2 and A3 peaks separated by approximately 1 eV and A2 exhibits a surface character. The pre-edge structures can be derived via the quadrupole transitions from 1s core orbitals to Ti 3d valence orbitals for the regular octahedral $Ti^{4+}$ ($3d^0$) hexacoordinated sites of bulk anatase $TiO_2$, but anatase $TiO_2$ exhibits a weak D2d distortion that partially allows the dipole transitions resulting from 3d/4p mixing so that anatase $TiO_2$ shows all the peaks in the pre-edge region. However, rutile $TiO_2$ exhibited only three peaks corresponding to A1, A3 and B. A strong O 2p-Ti 3d hybridization results in A3 peak, while A1 and B peaks predominantly stem from the quadrupole and dipole transitions. For rutile $TiO_2$, the other strong features appeared at C, D1, D2 and E result from the dipole transitions. The spectral difference between anatase and rutile $TiO_2$ is originated from different coordination geometries around Ti ions. A comparison of CFT with anatase and rutile $TiO_2$ allows one to analyze the pre- or post-edge features. Initially, A2 and A3 peaks were larger, but A1 and B peaks were smaller. The spectral change corresponds to enhanced 3d/4p mixing due to the stronger deviation of Ti ions from the octahedral symmetry. However, the peaks of CFT after the absorption edge region were broadened attributed to short- and long-range disorders. As a result, Ti oxide in CFT exhibited the highly distorted symmetry, indicating an amorphous phase.[23] The Ti K-edge EXAFS spectra for CFT and anatase $TiO_2$ show the similar radial distance for the first shell (Ti—O bond), but the radial distance for the second shell (Ti—Ti bond) is shifted, implying a phase change. We confirm that an amorphous $TiO_2$ exists as the shell layer of CFT (the inset of FIG. 9C). CFT has a distorted symmetry of Ti ions because it undergoes the core-shell stabilization process attributed to reduced Fe ions. A2 peak, signaling the surface character in the amorphous phase, is increased, while the spectrum of the post-edge region is broadened, as shown in FIG. 9C. The results support a slight reduction in Ti ions for CTF compared to that for CT via the blue-shifted rising edge position. The Fourier transformed EXAFS spectra (FIG. 9D) provide more detailed information on the bonds of Ti ions in coordination with the surrounding atoms. The radial distances of each Ti—O and Ti—Ti bond for CT are 1.54 Å and 2.68 Å, respectively. The Ti—O and Ti—Ti bonds for CFT change to 1.60 Å and 2.79 Å as a result of diffusion for core-shell stabilization. The Co K-edge XANES and EXAFS spectra for CFT and CT were measured. First, the Co K-edge XANES spectra demonstrate that their spectral shapes are similar, although the absorption edge of CFT was shifted to the right side since Co ions were oxidized during core-shell stabilization. The Co EXAFS spectra reveal the same trend as the Ti K-edge EXAFS spectra, indicating that the bonding structures of Co ions were affected by the changes in the surrounding atoms depending on the core-shell stabilization process. Anatase $TiO_2$ shows six Raman bands at 144 $cm^{-1}$ (Eg), 197 $cm^{-1}$ (Eg), 399 $cm^{-1}$ (B1g), 513 $cm^{-1}$ (A1g), 519 $cm^{-1}$ (B1g) and 639 $cm^{-1}$ (Eg), while rutile $TiO_2$ has four Raman bands at 143 $cm^{-1}$ (B1g), 447 $cm^{-1}$ (Eg), 612 $cm^{-1}$ (A1g), and 826 $cm^{-1}$ (B2g). The Raman spectra for CT show the same peaks as those of the pure anatase phase and no peaks related to the rutile phase (FIG. 9E). All the anatase $TiO_2$ peaks disappeared and decreased, indicating that $TiO_2$ contained in CFT is in an amorphous phase. Also, the cobalt hydroxide carbonate phase shows an intense sharp Raman peak at 1077 $cm^{-1}$ assigned to the $u_1CO_3^{2-}$ symmetric stretching mode. $Fe_3O_4$ phase in CFT shows the characteristic broad peak at 680 $cm^{-1}$($A_{1g}$). The suppressed photoluminescence (PL) of CFT (FIG. 9F) means the higher electron-hole separation rate than that of CT. Besides, the time-correlated single photon counting (TCSPC) experiments show the shorter lifetimes of the charge carriers in CFT (FIG. 9G), indicating faster electron transfer than CT. The ESR spectra from CFT, while CT does not have any ESR signal, indicate that unpaired electrons come from d orbitals of Fe oxide. This supports that the varied d orbitals in Fe oxide lead to efficient charge carrier transfer under illumination.

Figure 10A:
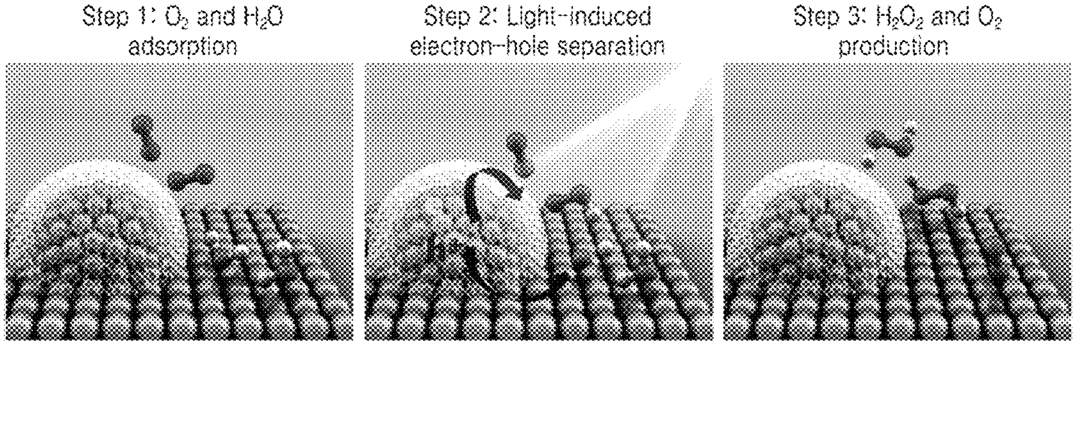
FIG. 10A to FIG. 10E show reaction mechanism for the direct conversion of $O_2$ into $H_2O_2$ according to an example of the present disclosure.
Figure 10B:
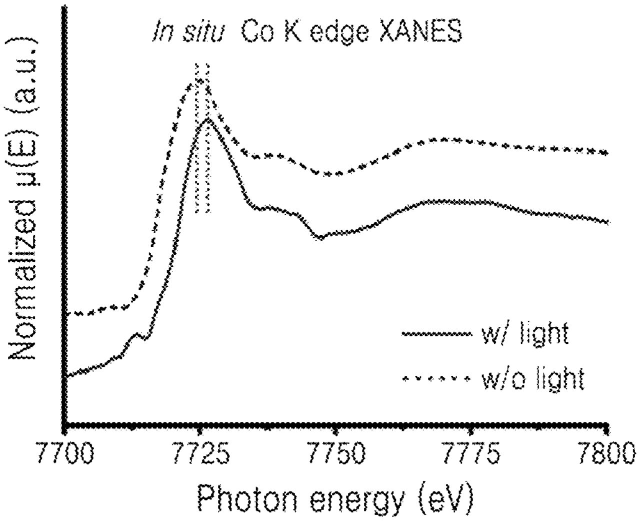
Figure 10C:
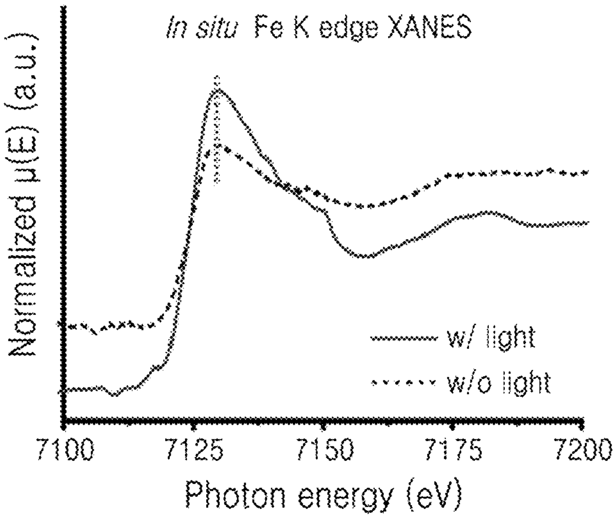

FIG. 10A illustrates the conversion mechanism of $O_2$ into $H_2O_2$. First, $H_2O$ and $O_2$ adsorb on cobalt hydroxide carbonate and titanium oxide sites, respectively. Then, the photogenerated holes from the iron oxide core-titanium oxide shell move to the cobalt hydroxide carbonate site producing protons and electrons from adsorbed $H_2O$ via four-electron pathway of WOR, while the electrons transfer towards the titanium oxide shell site to produce $H_2O_2$ from adsorbed $O_2$ via two-electron pathway from ORR by the following Chemical reaction formula 1 and 2:

$$2H_2O \rightarrow 4H^+ + 4e^- + O_2 \quad \text{[Chemical reaction formula 1]}$$

$$O_2 + 2H^+ + 2e^- \rightarrow H_2O_2 \quad \text{[Chemical reaction formula 2]}$$

Figure 10D:
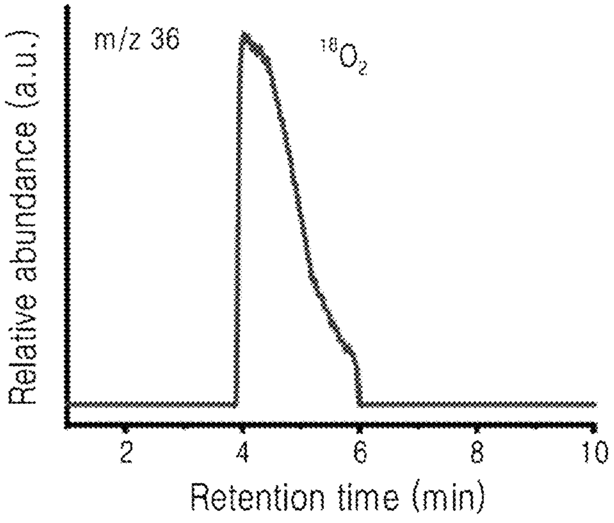
Figure 10E:
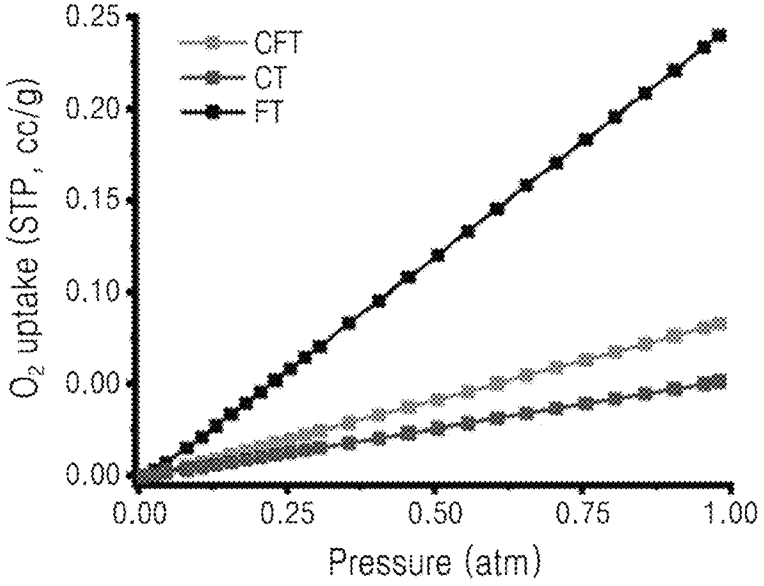
Figure 11:
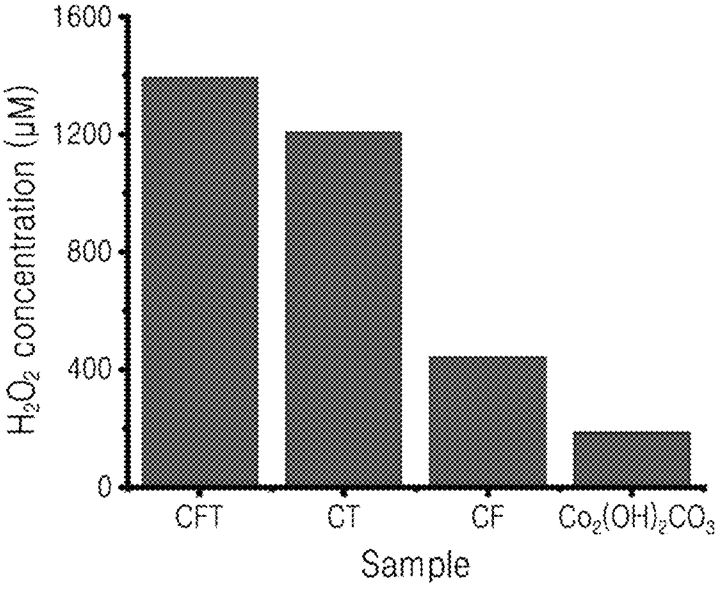
FIG. 11 shows $H_2O_2$ adsorption capacities of CFT, CT, CF and $Co_2(OH)_2CO_3$ according to an example of the present disclosure.

The in situ Co and Fe K-edge XANES spectra (FIG. 3B and FIG. 3C) with and without illumination were also utilized to elucidate whether each reaction occurred at the isolated redox site. The in situ Co K-edge XANES spectra show that the absorption edge moves approximately 2 eV to the right, verifying that cobalt hydroxide carbonate phase acts as a site for water oxidation. Besides, $H_2{}^{18}O$ mass spectrometry spectra were obtained to determine whether the evolved oxygen gas was generated via a photocatalytic reaction. FIG. 10D shows a peak at m/z=36 assigned to $^{18}O_2$, indicating that $H_2{}^{18}O$ was oxidized to $^{18}O_2$ through photocatalytic water oxidation. Since $H_2{}^{18}O$ occupies 1 mL of the total volume (5 mL), produced oxygen molecules should have different m/z values corresponding to 32 ($^{16}O$-$^{16}O$): 34 ($^{16}O$-$^{18}O$): 36 ($^{18}O$-$^{18}O$). Mass spectroscopy data show that the ratio is consistent with theoretical prediction. This demonstrates that 02 results from photocatalytic water oxidation upon light absorption. However, the in-situ Fe K-edge XANES analysis does not exhibit a significant change in the oxidation number of Fe ion, suggesting that Fe ion serves as a medium for charge transfer. FIG. 10E shows that CFT gives a about 1.6-fold increase in $O_2$ adsorption capacity than CT, but about 2.9 folds lower than FT. This supports that the iron oxide-titanium oxide shell structure of CFT allows rich $O_2$ adsorption reactions, thereby facilitating ORRs at the titanium oxide site. FIG. 11 also reveals that $H_2O_2$ adsorption capacity of $Co_2(OH)_2CO_3$ is about 7-fold lower than that of CFT. This means that $H_2O_2$ molecules produced from molecular oxygen could not adsorb actively on $Co_2(OH)_2CO_3$, thereby leading to suppress the decomposition of $H_2O_2$.

Figure 12:
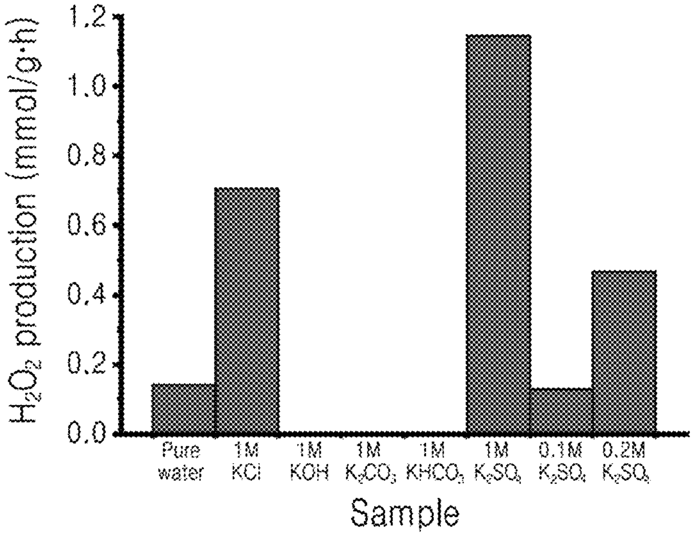
FIG. 12 shows photocatalytic $H_2O_2$ production according to kind and concentration of electrolytes according to an example of the present disclosure.
Figure 13:
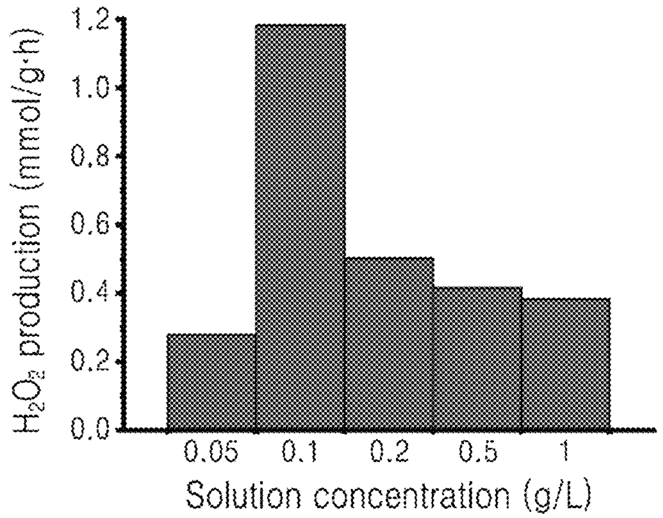
FIG. 13 shows photocatalytic $H_2O_2$ production according to the concentration of reaction suspension according to an example of the present disclosure.
Figure 14A:
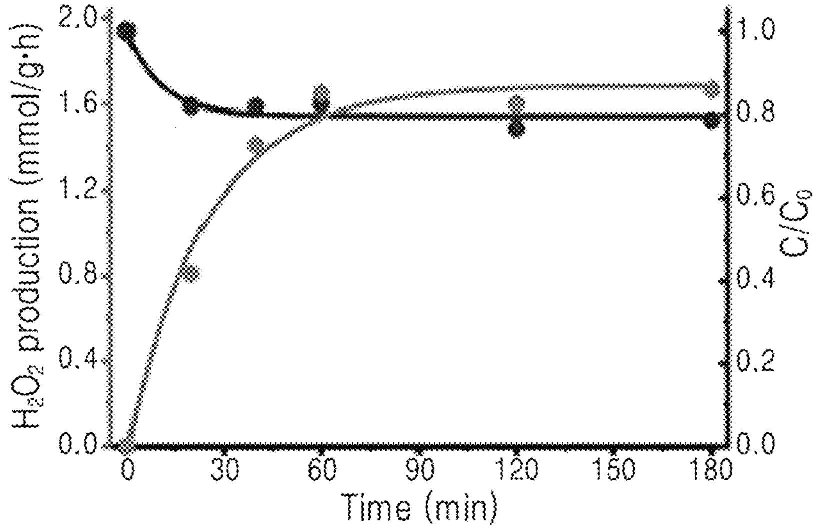
FIG. 14A to FIG. 14F show performances for the direct photosynthetic conversion of $O_2$ into $H_2O_2$ according to an example of the present disclosure.
Figure 14B:
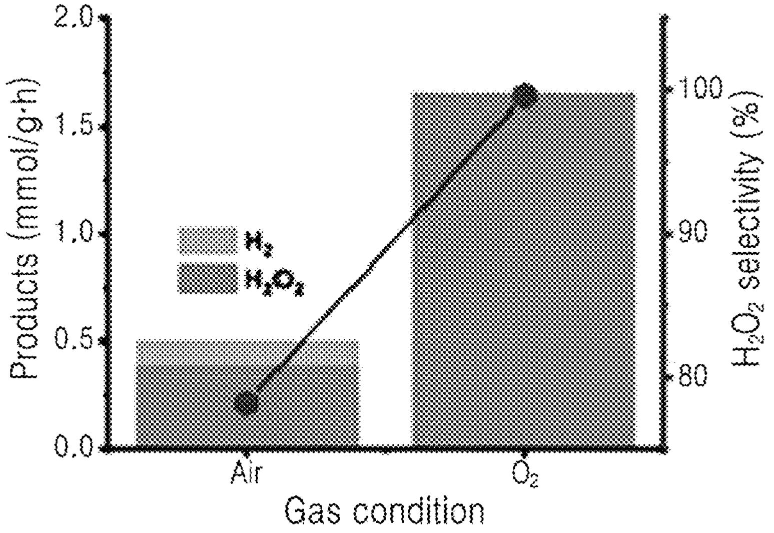
Figure 14C:
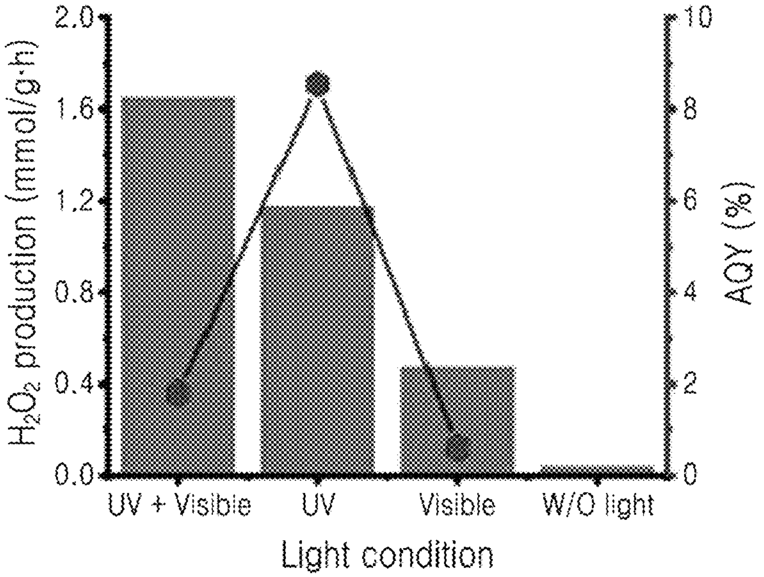
Figure 14D:
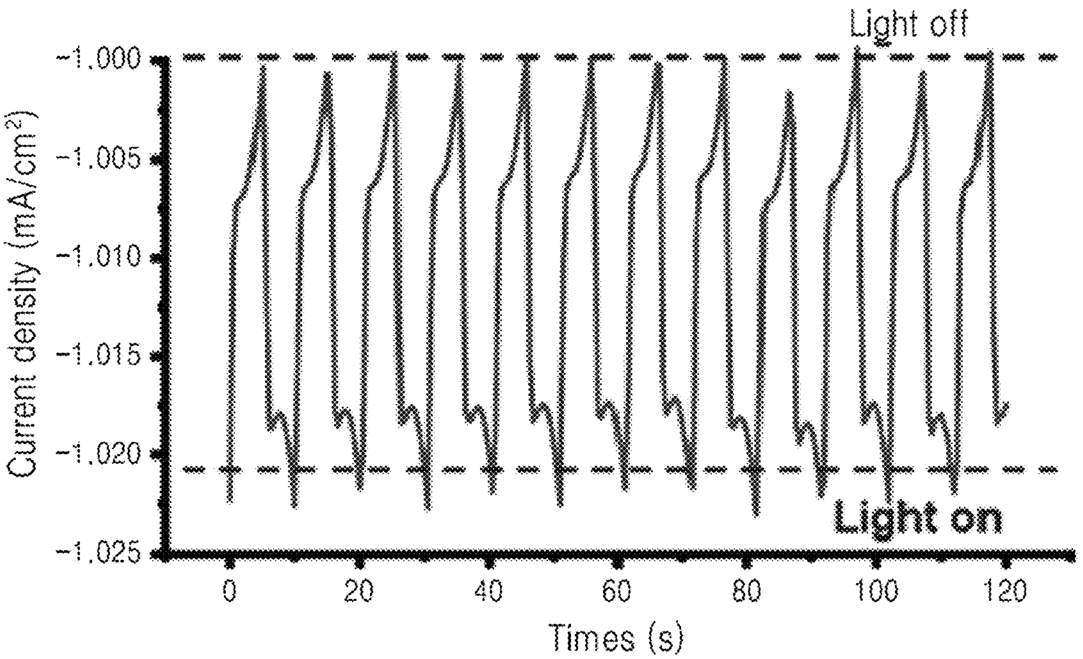
Figure 14E:
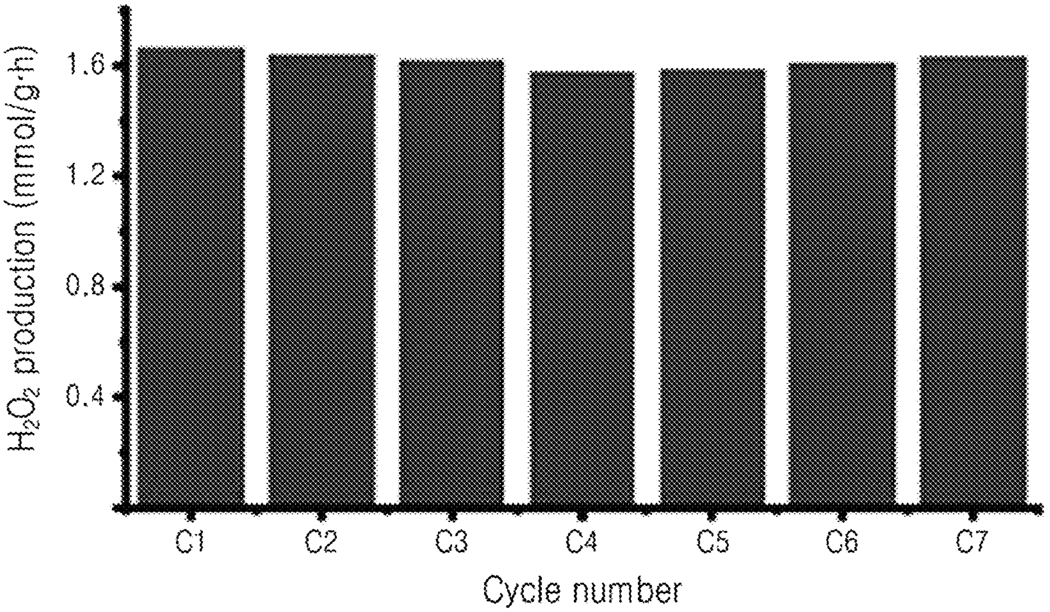
Figure 14F:
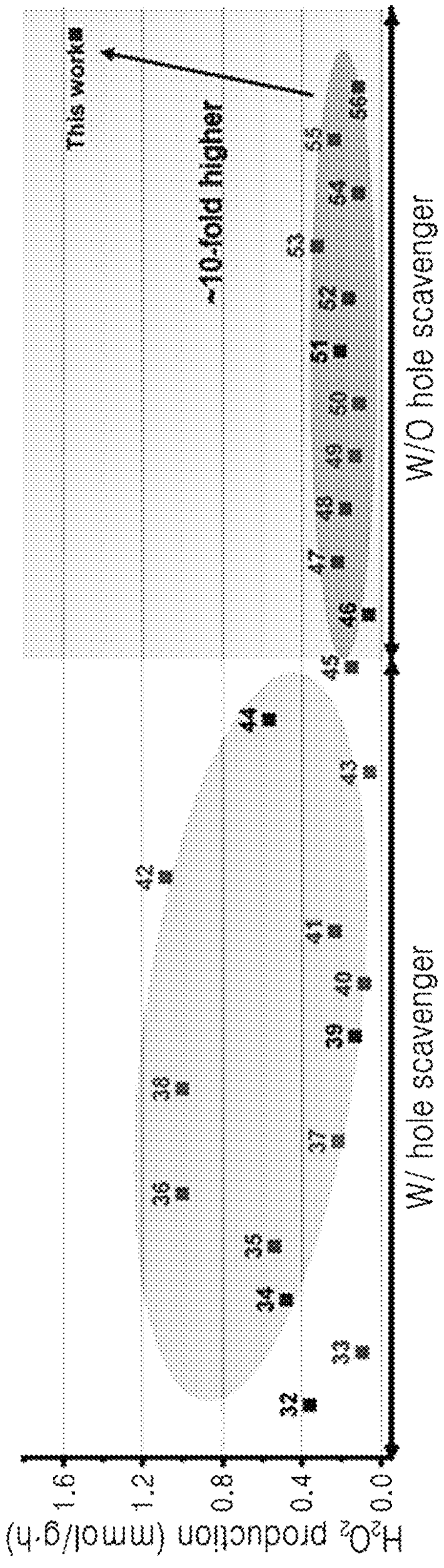
Figure 15:
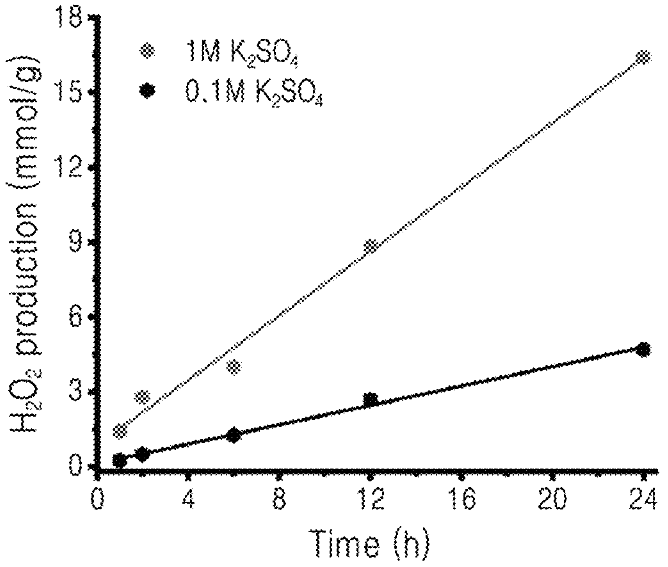
FIG. 15 shows photocatalytic $H_2O_2$ production of CFT under continuous $O_2$ purging conditions depending on the concentration of $K_2SO_4$ according to an example of the present disclosure.
Figure 16:
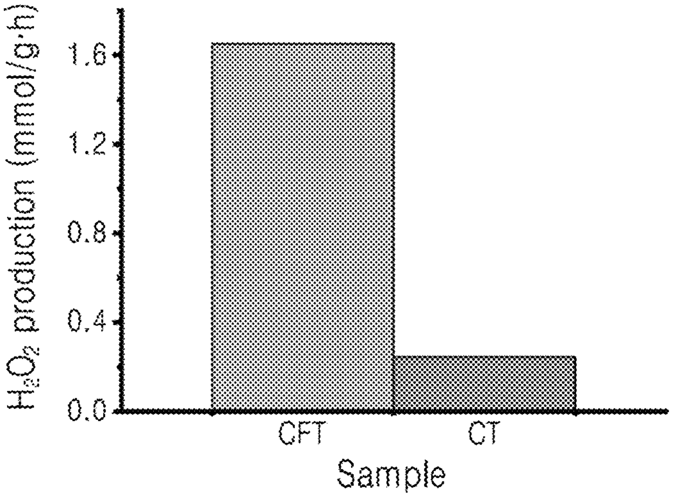
FIG. 16 shows photocatalytic $H_2O_2$ production of CFT compared to that of CT according to an example of the present disclosure.
Figure 17:
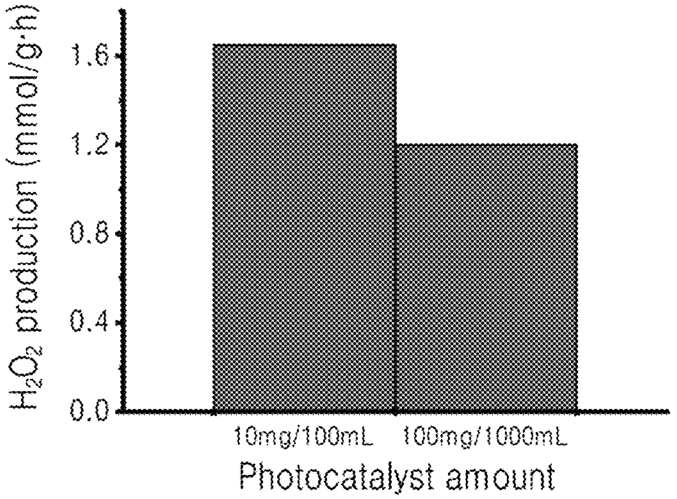
FIG. 17 shows photocatalytic $H_2O_2$ production according to the amount of photocatalysts with same solution concentration according to an example of the present disclosure.

The photocatalysts for conversion of 02 into $H_2O_2$ were also evaluated. The UV-Vis absorption spectra versus wavelengths and the linear fitting curve for integrated absorbance versus $H_2O_2$ concentration were measured. Triiodide ions generated via $H_2O_2$ oxidation under an iodide ion and hydrogen phthalate aqueous solution lead to the absorption at 350 nm so that the absorbance increases with the increasing $H_2O_2$ concentration. However, FIG. 12 shows that $H_2O_2$ can be easily decomposed via the proton-coupled electron transfer (PCET) under the basic conditions. Herein, $H_2O_2$ production was optimized under the neutral 1 M $K_2SO_4$ condition favored for $H_2O_2$ extraction. The solution concentration promoting $H_2O_2$ conversion (FIG. 13) was 0.1 g/L. FIG. 14A also shows that CFT gives high activity (1.67 mmol $H_2O_2$/g·h) in a closed reaction system after 30 min of $O_2$ purging. The dissolved $O_2$ molecules were reduced quickly to $H_2O_2$ molecules and saturated in an hour, supporting that the kinetics for $O_2$ reduction is very fast without sacrificial reagent. The rate for $H_2O_2$ production follows the zero-order kinetics while that for $H_2O_2$ decomposition follows the first-order kinetic by the following Equation 3:

$$[H_2O_2] = (k_f / k_d)\{1 - \exp^{-kdt}\} \quad \text{[Equation 3]}$$

with $k_f$ and $k_d$ referring to the formation and decomposition rates, respectively. We find that $k_f$ and $k_d$ are 6.77 (μM/min) and 0.04 (μM/min). It is noteworthy that the $k_d$ is very slow on CFT. In FIG. 15, we have measured $H_2O_2$ production under continuous $O_2$ purging in 1 M and 0.1 M $K_2SO_4$, respectively revealing that the both formation rate have zero-order kinetics. This suggests that the concentration of $K_2SO_4$ enables fast charge transfer. Additional, $H_2O_2$ production under the $O_2$-saturation (FIG. 14B) shows about 100% $H_2O_2$ selectivity while $H_2$ gas was detected under the air-purged condition. The bar chart (FIG. 14C) summarizes the measured apparent quantum yields (AQYs). The $H_2O_2$ was not produced without light, but the high AQY values of 1.8% are achieved over the UV and visible light region. FIG. 16 shows that CFT leads to a about 4.8-hold higher yield than CT meaning that it makes possible to have the rapid charge transfer and light absorption from core-shell structure of CFT. Moreover, we conducted both photocatalytic and electrocatalytic water oxidation experiments to unveil the water oxidation sites. The photocatalytic activity was measured with $AgNO_3$ as a sacrificial reagent to exclude the reduction reaction. It shows that CFT has a doubled activity for photocatalytic water oxidation compared to CT attributed to the enhancement of the light absorption by iron oxide. Furthermore, the electrochemical water oxidation was measured under 0.1 M $K_2SO_4$ electrolyte. The oxidation current in electrochemical water oxidation voltage range shows the same tendency with that in photocatalyst, supporting that $Co_2(OH)_2CO_3$ plays as an active site for water oxidation. The cyclic voltammetry curve also shows a cathodic peak (from −0.1 V vs Ag/AgCl), showing that $H_2O_2$ is produced via the 2-electron ORR. In addition, FIG. 14D reveals the chopped photocurrent density of CFT under the $O_2$-saturated 1 M $K_2SO_4$ solution on −0.4 V (vs. Ag/AgCl) during light-on/off cycles. The high photocurrent of about 25 μA/cm$^2$ was achieved and it shows that CFT produces $H_2O_2$ via the photoelectrochemical (PEC) process over −0.1 V to −0.8 V (vs. Ag/AgCl) of ORR. Photocurrent-potential (I-V) curves for PEC oxygen reduction also support that the overpotential for ORR decreases in the presence of light. The Nyquist plots for the electrochemical impedance spectroscopy spectra of CFTs with or without light include the effects by the series resistance (R1), powder-transferred substrate resistance (R2), and catalyst/electrolyte interface resistance (R3). R1 and R2 values were similar, but R3 value of 651.7 Ω without light was about 2.4-fold higher than that of 276.7 Ω with light. FIG. 14E reveals that the direct conversion ability by CFT is maintained during the repeated cycle reactions. FIG. 14F supports that the activity of CFT is far superior to those of other single- or dual-phase photocatalysts by about 10-folds. Also, we find that high activity in $H_2O_2$ conversion (FIG. 17) is well maintained even at the about 10-fold higher mass loading of CFT photocatalysts.

3. Conclusion

In summary, we demonstrated a highly active, selective, and stable triphasic metal oxide photocatalyst with reaction-specific sites for water oxidation, charge transfer, and oxygen reduction involving in the direct conversion of $O_2$ into $H_2O_2$. The triphasic metal oxide photocatalyst was synthesized from phase control and core-shell stabilization. The imbalance of metal precursor ratios with different oxidation numbers induced the phase separation of water oxidation and oxygen reduction sites, and the chemically unstable metal ions led to diffusion towards the core region to form a core-shell morphology comprising the oxygen reduction site. The water oxidation site was constructed with a cobalt hydroxide carbonate nanosheet phase, while the oxygen reduction site was synthesized using two iron oxide and titanium oxide phases. The different surface energies of 0.78 $J/m^2$ (anatase) and 0.93 $J/m^2$ (rutile) for the titanium oxide and 1.39 $J/m^2$ for the iron oxide resulted in the formation of a core-shell morphology. Also, the band gaps for the iron oxide (2.02 eV), the titanium oxide (2.86 eV for rutile, 3.21 eV for anatase), and the cobalt hydroxide carbonate (3.80 eV) allowed Vis-to-UV light absorptions. The in situ/ex situ experiments and density functional theory simulations proved that the cobalt hydroxide carbonate nanosheet led to efficient water oxidation and that the iron oxide core-titanium oxide shell structure resulted in fast exciton separation. The core-shell structure was determined to promote hole transfer towards the VBM state of the water oxidation site providing the suppression of the hole-induced $H_2O_2$ decomposition at the oxygen reduction site. Furthermore, the photoseparated electrons were shown to move into the CBM state of the oxygen reduction site, where $H_2O_2$ is directly produced from $O_2$. These reaction site-specific sites led to about ten-fold higher activity than singe-phase or dual-phase photocatalysts, —100% selectivity, and robust cycle stability in $H_2O_2$ production under neutral electrolytic conditions without sacrificial scavengers. Consequently, these investigations support that through control of reaction-specific sites it is possible to realize high-performance triphasic metal oxide photocatalysts for solar-to-fuel conversion using only water and solar energy.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A composite, comprising:
a nanosheet including a cobalt oxide; and
a core-shell particle including a core including an iron oxide and a shell including a titanium oxide,
wherein the core-shell particle is located on the nanosheet, and
wherein the cobalt oxide includes at least one selected from $(Co_2(OH)_2CO_3)$, $CO_2O_3$, or CoO.

2. The composite of claim 1,
wherein the iron oxide includes at least one selected from $Fe_3O_4$, FeO, and $Fe_3O_3$.

3. The composite of claim 1,
wherein the titanium oxide includes $TiO_2$.

4. The composite of claim 1,
wherein a diameter of the core-shell particle is 10 nm to 50 nm.

5. The composite of claim 1,
wherein a thickness of the shell is 1 nm to 10 nm.

6. The composite of claim 1,
wherein the nanosheet is in contact with the core of the core-shell particle.

7. The composite of claim 1,
wherein the core absorbs visible light, and the shell absorbs ultraviolet light.

8. The composite of claim 1,
wherein the nanosheet serves as a water oxidation site.

9. The composite of claim 1,
wherein the core-shell particle serves as an oxygen reduction site.

10. A photocatalyst, comprising the composite according to claim 1.

11. The photocatalyst of claim 10,
wherein the photocatalyst is used for production of hydrogen peroxide.

12. A method of preparing a composite, comprising
performing hydrothermal reaction of a cobalt ion-containing precursor, an iron ion-containing precursor, and a titanium ion-containing precursor to form a composite,
wherein the composite comprises a nanosheet including a cobalt oxide, a core-shell particle including a core including an iron oxide, and a shell including a titanium oxide,
wherein the core-shell particle is located on the nanosheet, and
wherein the cobalt oxide includes at least one selected from $(Co_2(OH)_2CO_3)$, $Co_2O_3$, or CoO.

13. The method of claim 12,
wherein a temperature range of the hydrothermal reaction is 50° C. to 200° C.

14. The method of claim 12,
wherein the hydrothermal reaction is one-pot reaction.

15. The method of claim 12,
wherein the hydrothermal reaction is performed for 1 hour to 72 hours.

16. The method of claim 12,
wherein the cobalt ion-containing precursor is a salt containing cobalt bivalent ion.

17. The method of claim 12,
wherein the iron ion-containing precursor is a salt containing trivalent iron ion.

18. The method of claim 12,
wherein the titanium ion-containing precursor is a salt containing tetravalent titanium ion.

19. The method of claim 12,
wherein an average oxidation number of the cobalt ion is 0.67 or more.

* * * * *